United States Patent
Shin et al.

(10) Patent No.: US 11,844,114 B2
(45) Date of Patent: Dec. 12, 2023

(54) METHOD AND APPARATUS FOR TRANSMITTING AND RECEIVING SIGNALS IN WIRELESS COMMUNICATION SYSTEM

(71) Applicant: LG ELECTRONICS INC., Seoul (KR)

(72) Inventors: Seokmin Shin, Seoul (KR); Suckchel Yang, Seoul (KR); Seonwook Kim, Seoul (KR); Joonkui Ahn, Seoul (KR); Changhwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 218 days.

(21) Appl. No.: 17/310,494

(22) PCT Filed: Feb. 13, 2020

(86) PCT No.: PCT/KR2020/002030
§ 371 (c)(1),
(2) Date: Aug. 5, 2021

(87) PCT Pub. No.: WO2021/166991
PCT Pub. Date: Aug. 20, 2020

(65) Prior Publication Data
US 2022/0117003 A1  Apr. 14, 2022

Related U.S. Application Data

(60) Provisional application No. 62/808,878, filed on Feb. 22, 2019.

(30) Foreign Application Priority Data

Feb. 15, 2019  (KR) .................. 10-2019-0018029
Mar. 28, 2019  (KR) .................. 10-2019-0036406

(Continued)

(51) Int. Cl.
*H04W 74/08* (2009.01)
*H04L 27/26* (2006.01)
(Continued)

(52) U.S. Cl.
CPC ....... *H04W 74/0841* (2013.01); *H04L 1/0008* (2013.01); *H04L 27/26025* (2021.01);
(Continued)

(58) Field of Classification Search
CPC ......... H04W 74/0841; H04W 72/0453; H04W 72/1263; H04W 74/0866; H04W 74/0833;
(Continued)

(56) References Cited

U.S. PATENT DOCUMENTS 9,814,066 B2    11/2017  Bertrand et al.
2017/0019932 A1*  1/2017  Su ........................ H04J 11/00
(Continued)

FOREIGN PATENT DOCUMENTS

WO    2017027059    2/2017
WO    2017030412    2/2017
WO    2018221882    6/2018

OTHER PUBLICATIONS

PCT International Application No. PCT/KR2020/002030, International Search Report dated Jun. 11, 2020, 16 pages.

*Primary Examiner* — Yu-Wen Chang
(74) *Attorney, Agent, or Firm* — LEE HONG DEGERMAN KANG & WAIMEY

(57) ABSTRACT

A method and an apparatus for transmitting and receiving signals in a wireless communication system according to one embodiment of the present invention comprises transmitting a first physical random access channel (PRACH), and receiving a random access response (RAR) on the basis thereof, wherein the first PRACH may be configured by a PRACH sequence of a particular length, which is mapped to (Continued)

12 consecutive physical resource blocks (PRBs), being repetitively mapped multiple times in the frequency domain.

8 Claims, 27 Drawing Sheets

(30) Foreign Application Priority Data

| | | |
|---|---|---|
| May 3, 2019 | (KR) | 10-2019-0052598 |
| May 10, 2019 | (KR) | 10-2019-0055323 |

(51) Int. Cl.
    *H04L 1/00*     (2006.01)
    *H04W 72/0453*     (2023.01)
    *H04W 72/1263*     (2023.01)

(52) U.S. Cl.
    CPC ... *H04W 72/0453* (2013.01); *H04W 72/1263* (2013.01); *H04W 74/0866* (2013.01)

(58) Field of Classification Search
    CPC .............. H04W 76/28; H04L 1/0008; H04L 27/26025; H04L 5/0007; H04L 1/08; H04L 1/1822
    See application file for complete search history.

(56) References Cited

U.S. PATENT DOCUMENTS

| | | | |
|---|---|---|---|
| 2018/0184448 | A1 | 6/2018 | Hou et al. |
| 2018/0255586 | A1* | 9/2018 | Einhaus ............ H04W 52/0219 |
| 2019/0132882 | A1* | 5/2019 | Li ..................... H04W 74/0833 |
| 2019/0223255 | A1* | 7/2019 | Jeon ......................... H04L 5/00 |
| 2019/0306895 | A1* | 10/2019 | Kasparick ............. H04W 88/02 |
| 2020/0236524 | A1* | 7/2020 | Ye ......................... H04L 5/1469 |
| 2021/0250986 | A1* | 8/2021 | Luo .................... H04W 72/0453 |
| 2021/0410184 | A1* | 12/2021 | Talarico ................. H04L 5/005 |
| 2022/0095378 | A1* | 3/2022 | Lei ..................... H04W 74/006 |

\* cited by examiner

[Fig. 1]
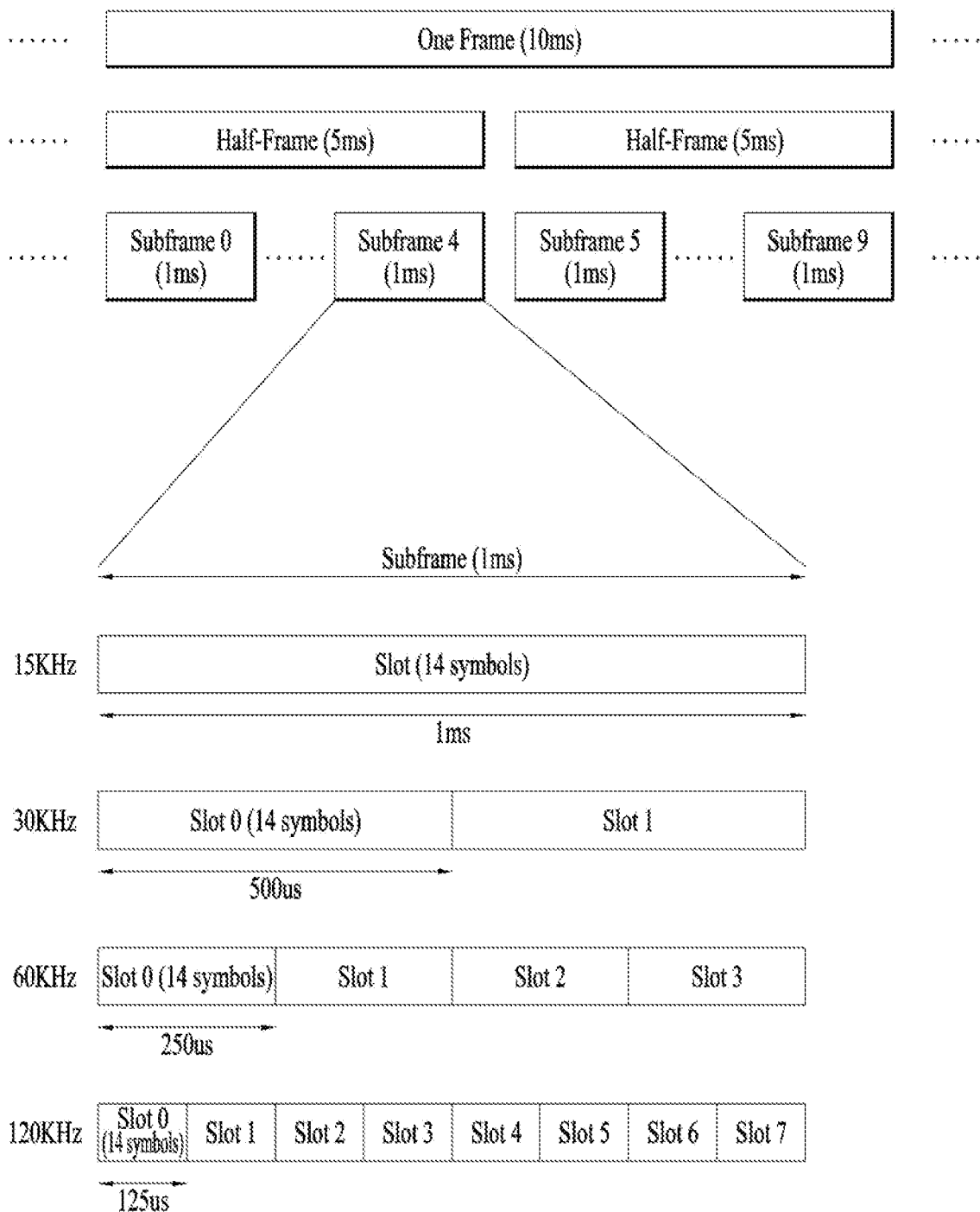

[Fig. 2]
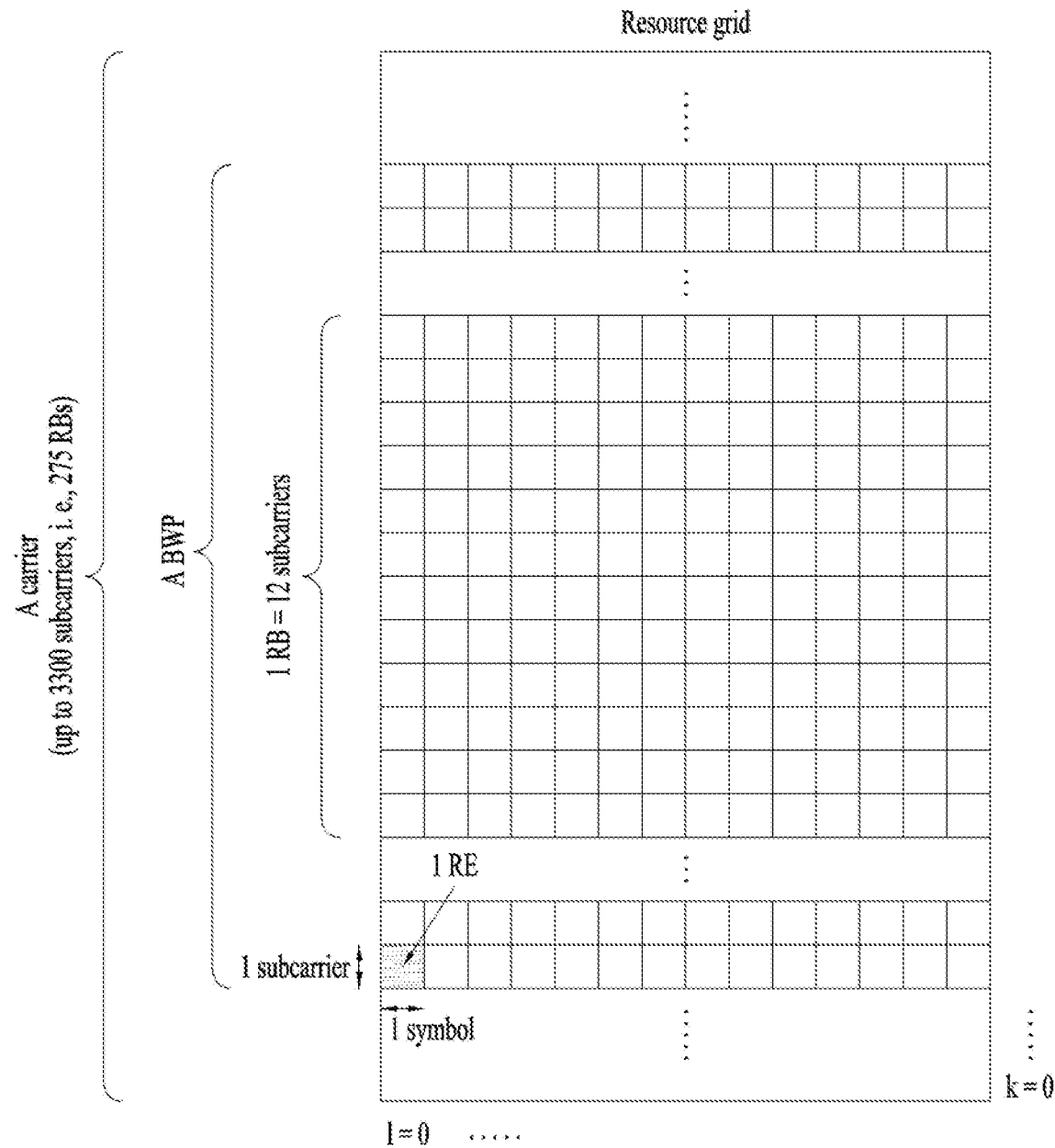

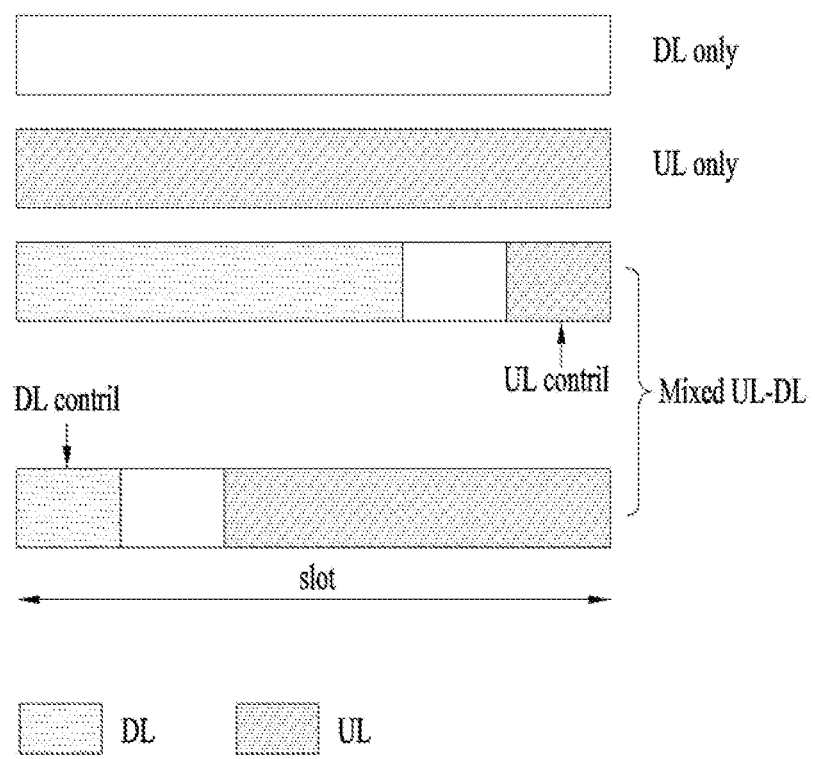
[Fig. 3]

[Fig. 4]
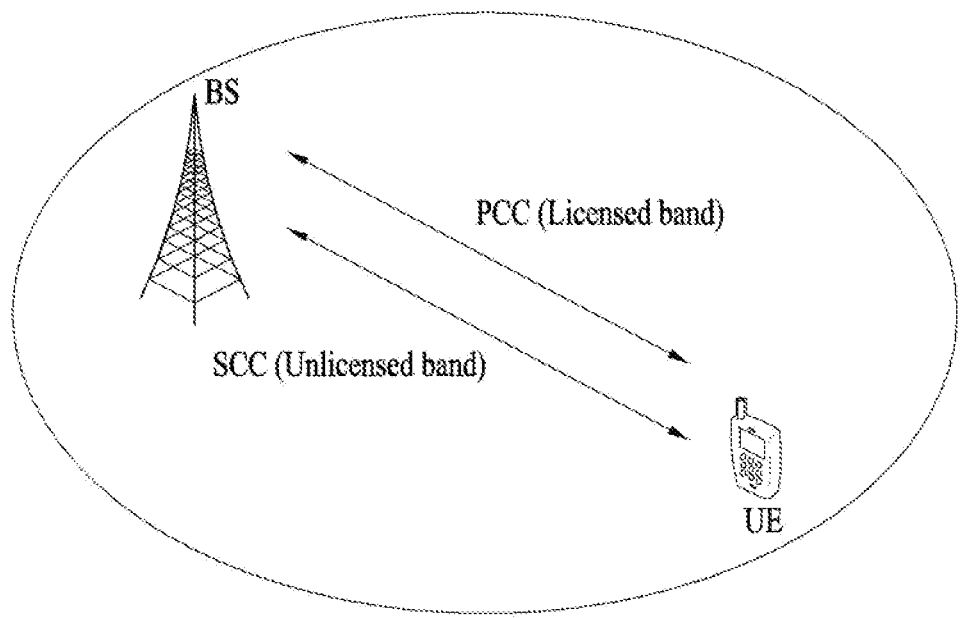
(a) Carrier aggregation between L-band and U-band
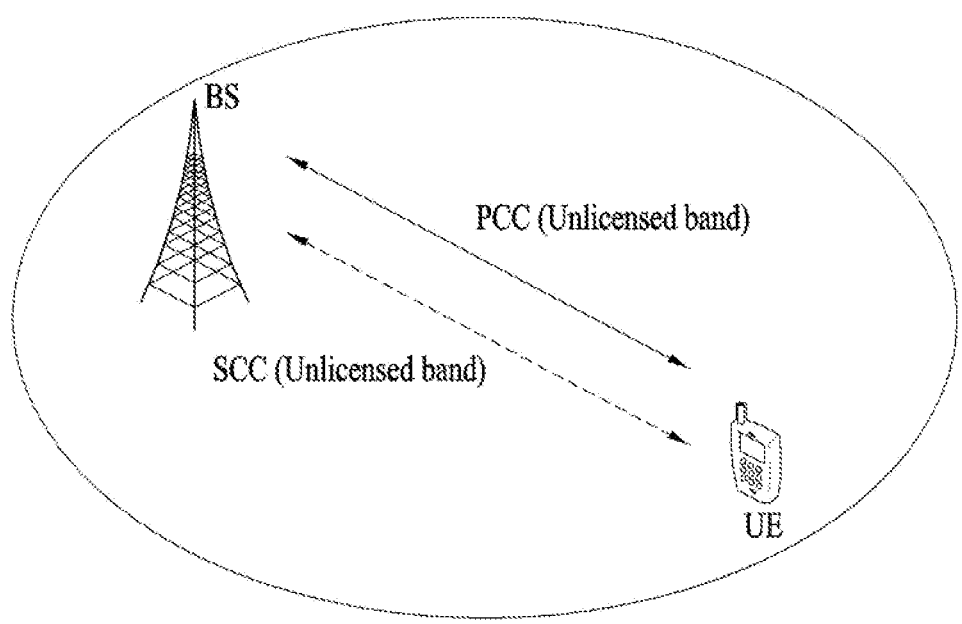
(b) Standalone U-band(s)

[Fig. 5]
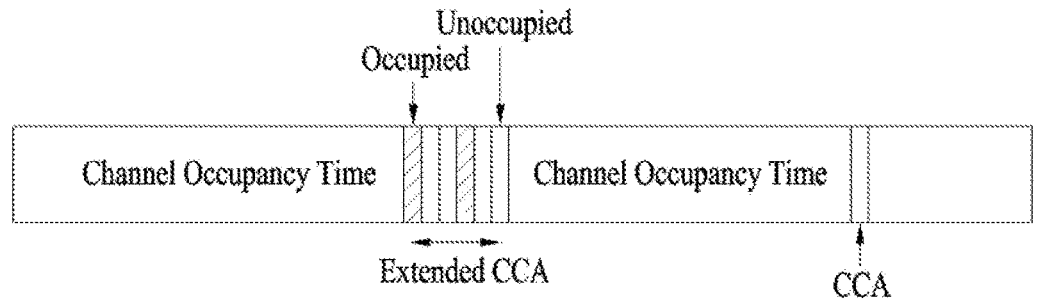
[Fig. 6]
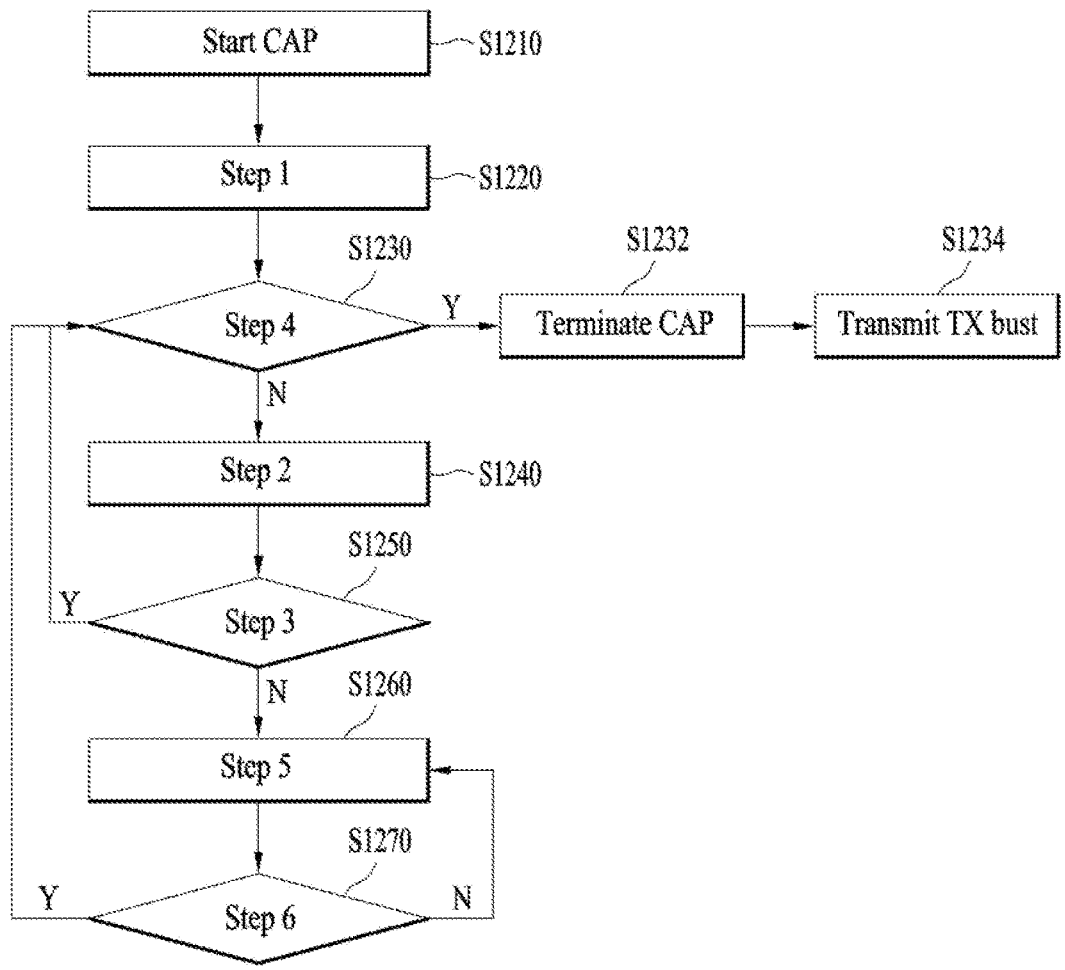

[Fig. 7]
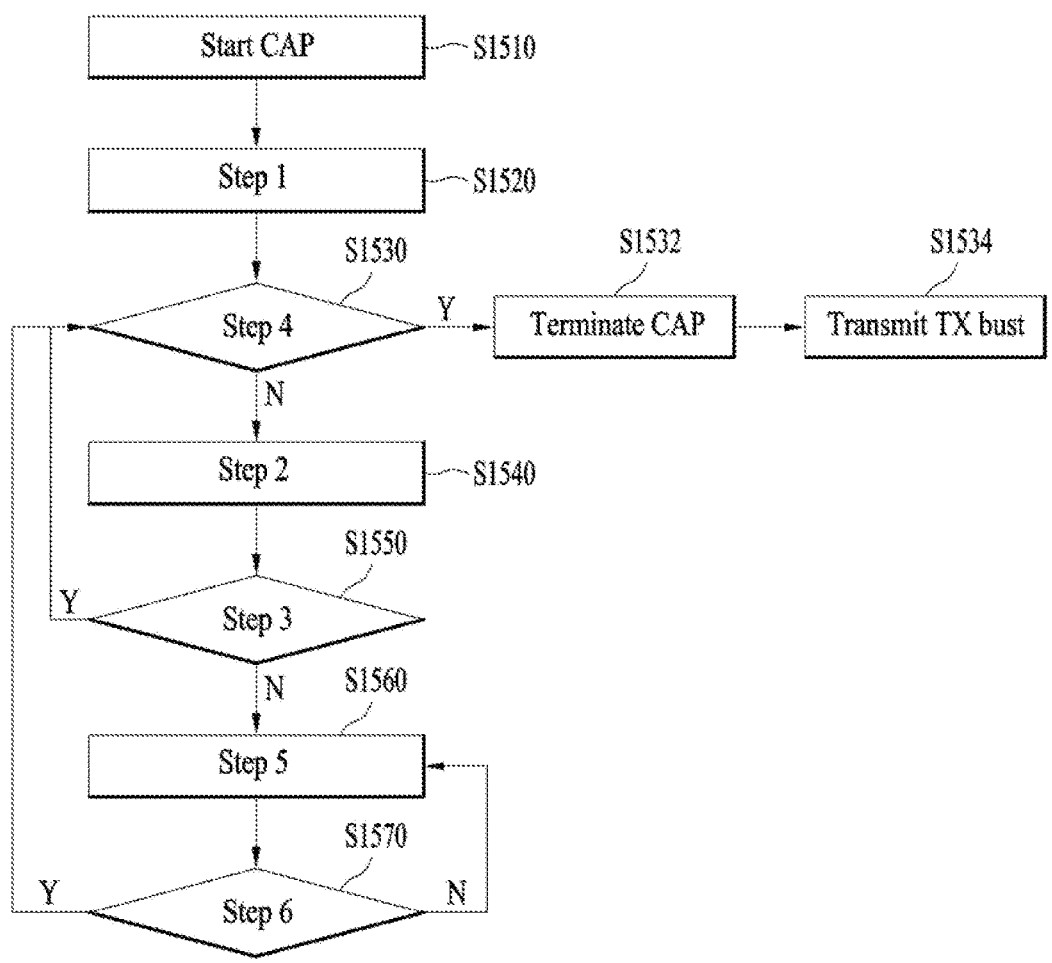

[Fig. 8]
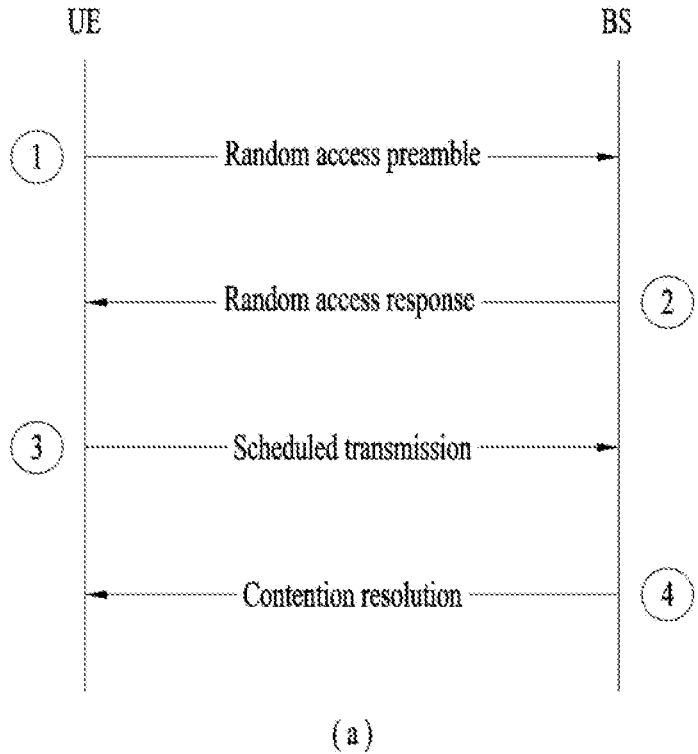
(a)
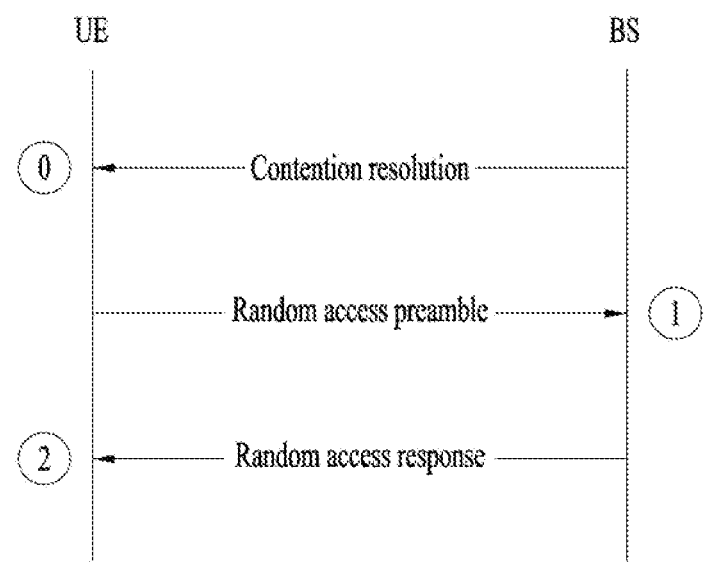
(b)

【Fig. 9】
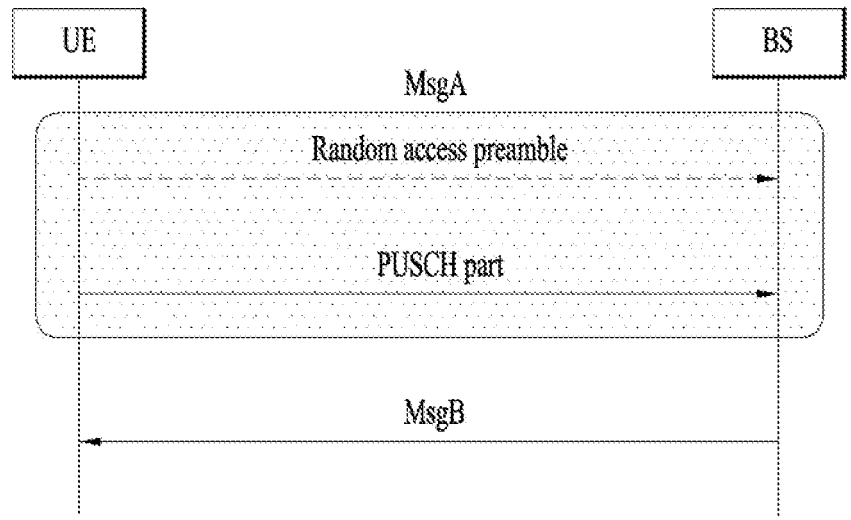
(a)
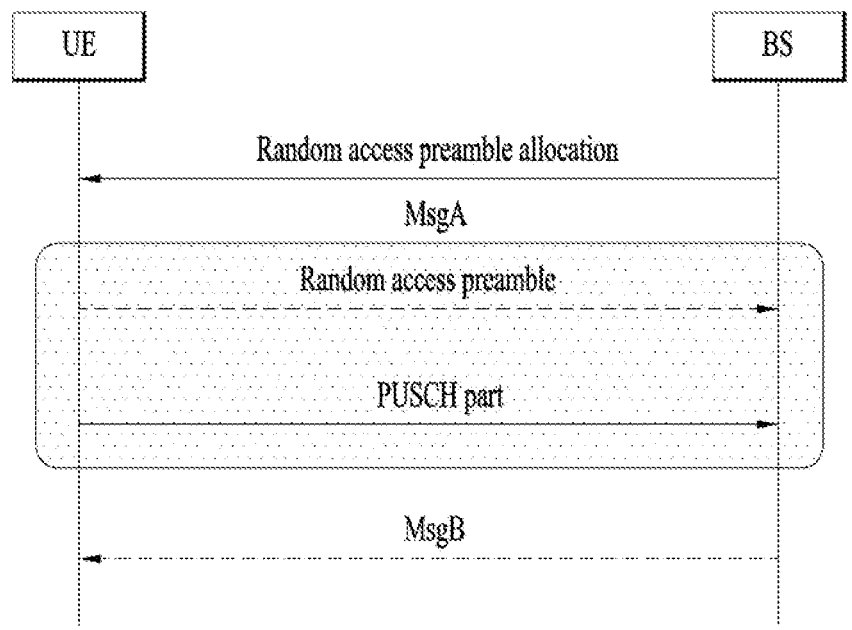
(b)

[Fig. 10]
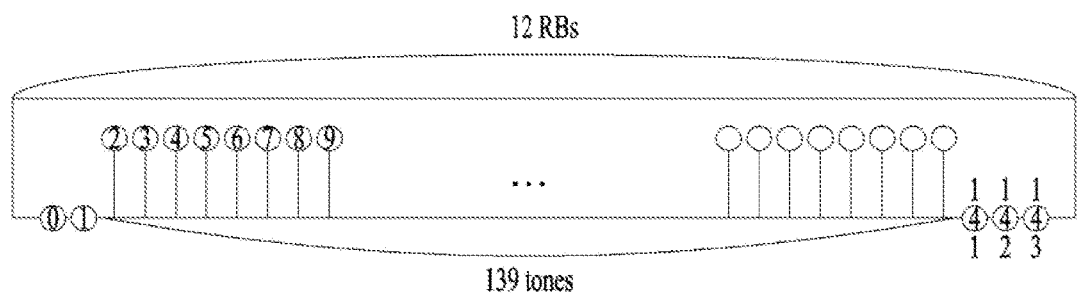

[Fig. 11]
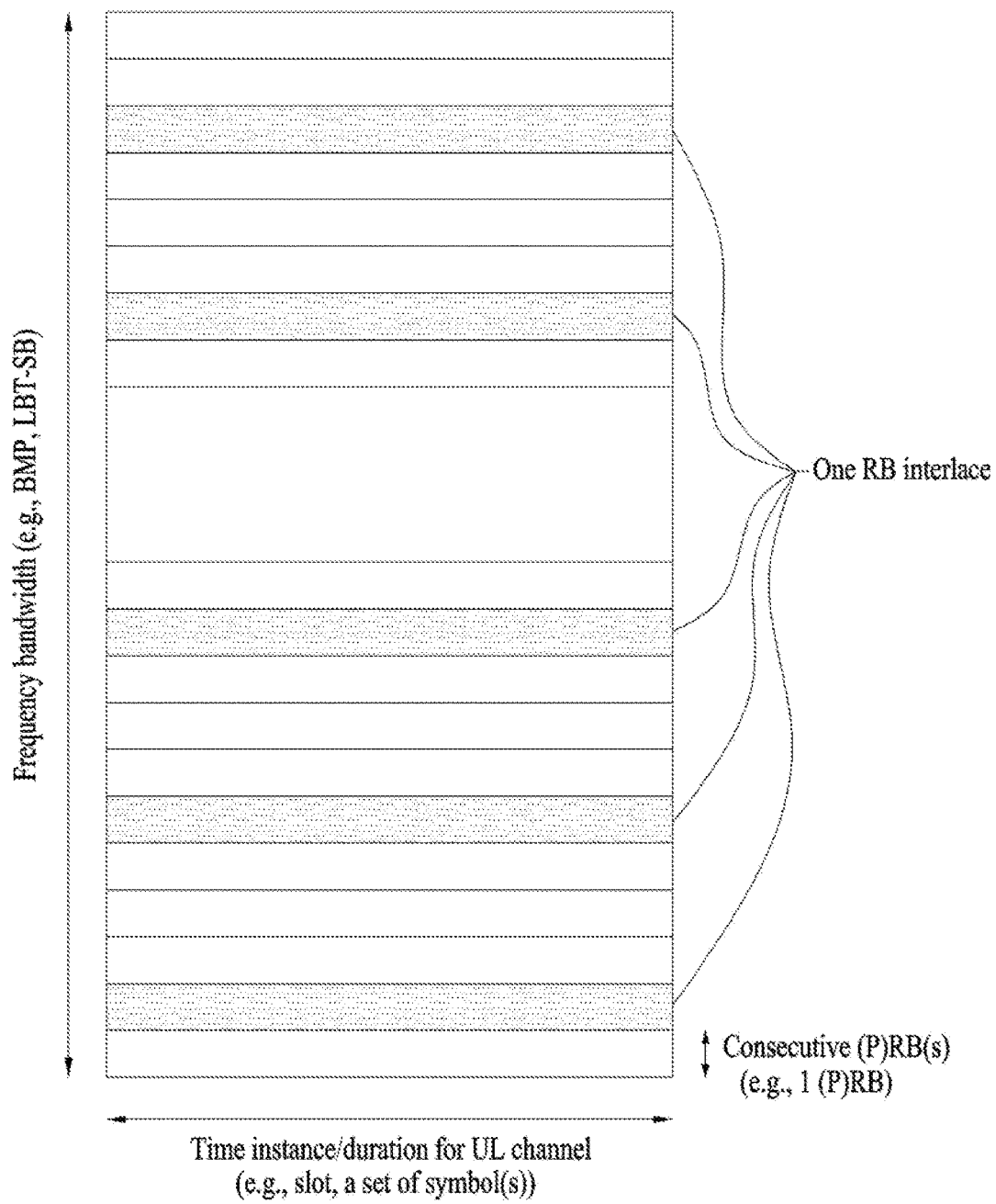

[Fig. 12]
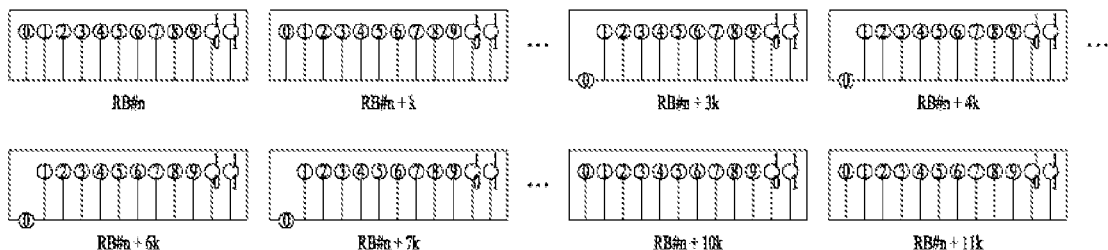
(a)
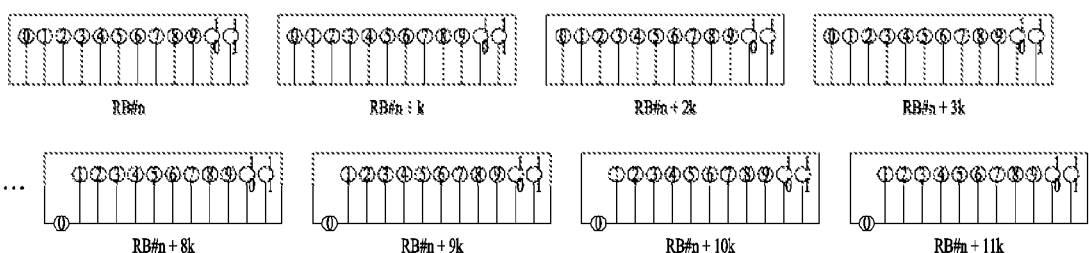
(b)
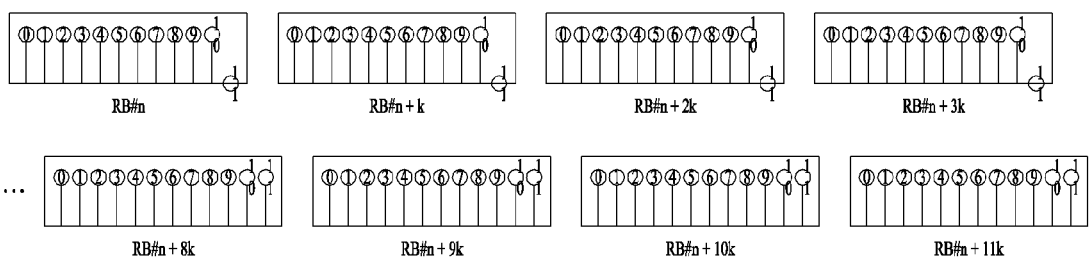
(c)

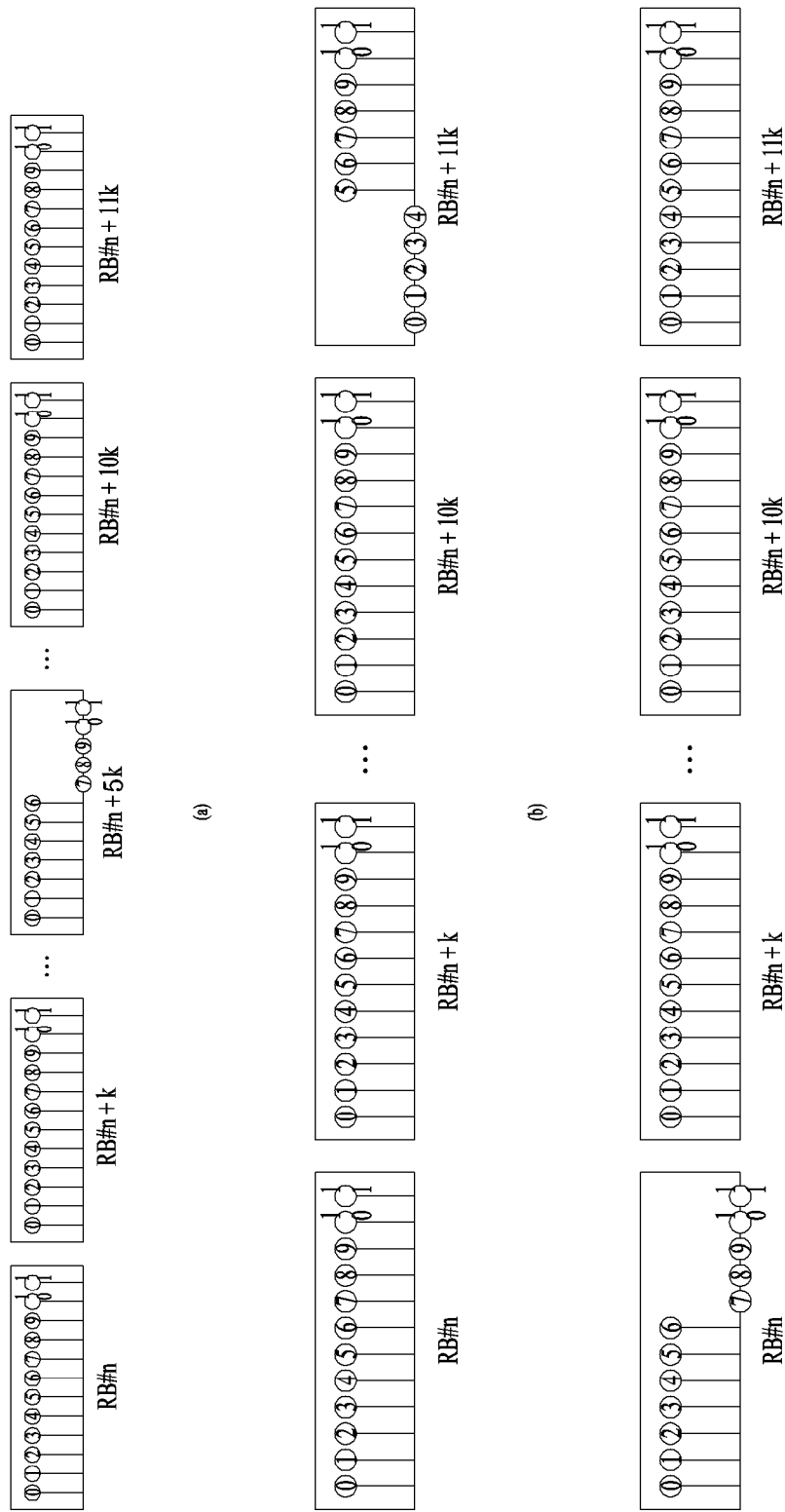
[Fig. 13]

[Fig. 14]
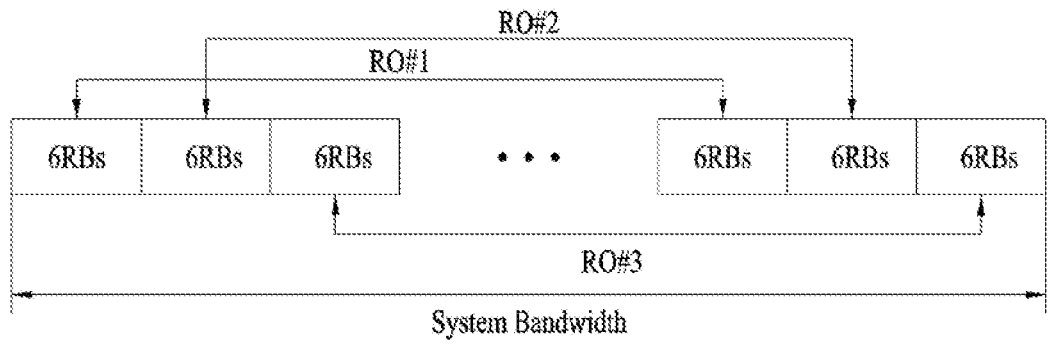
(a)
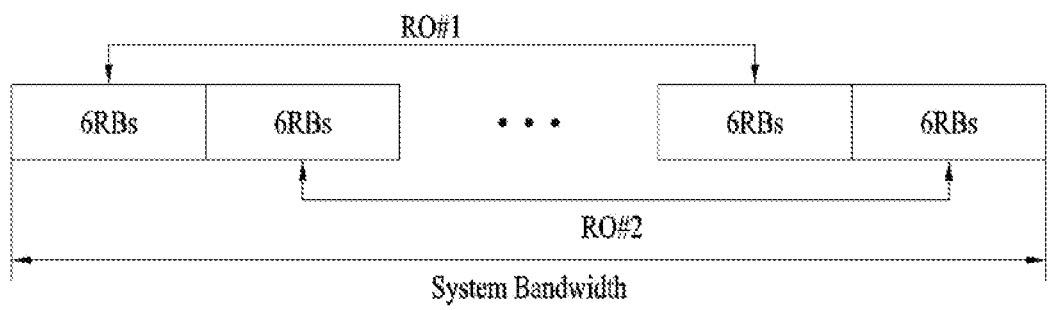
(b)
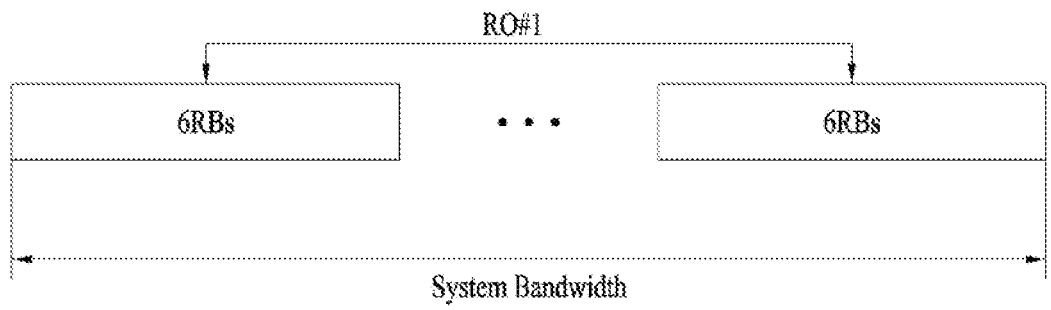
(c)

【Fig. 15】
(a)
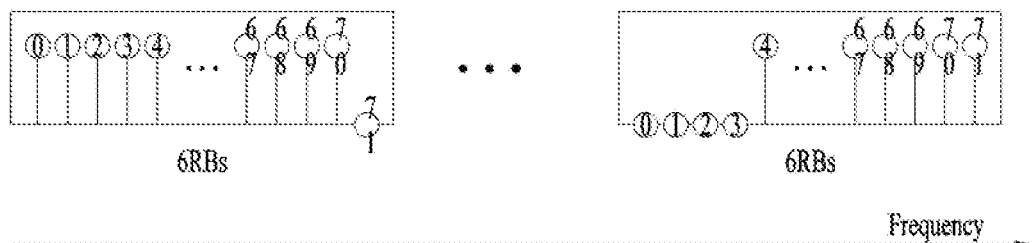
(b)
(c)
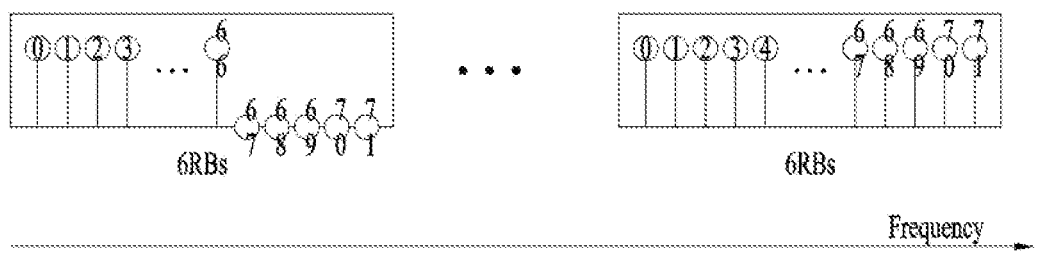
(d)

[Fig. 16]
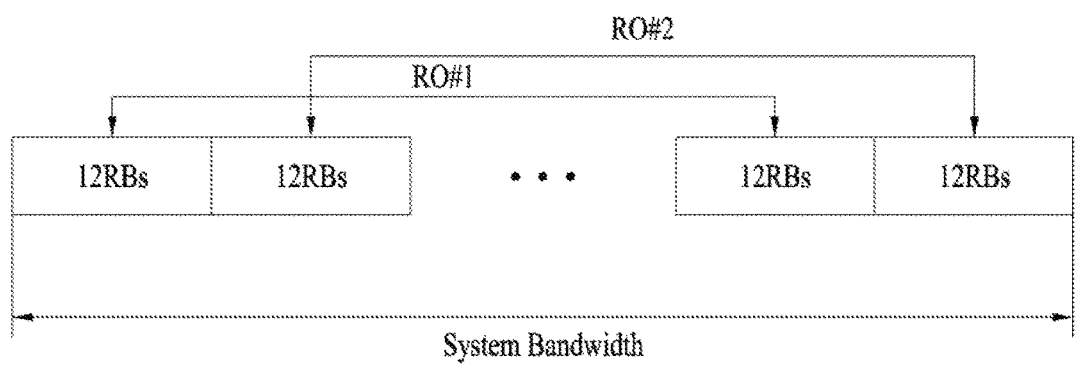
(a)
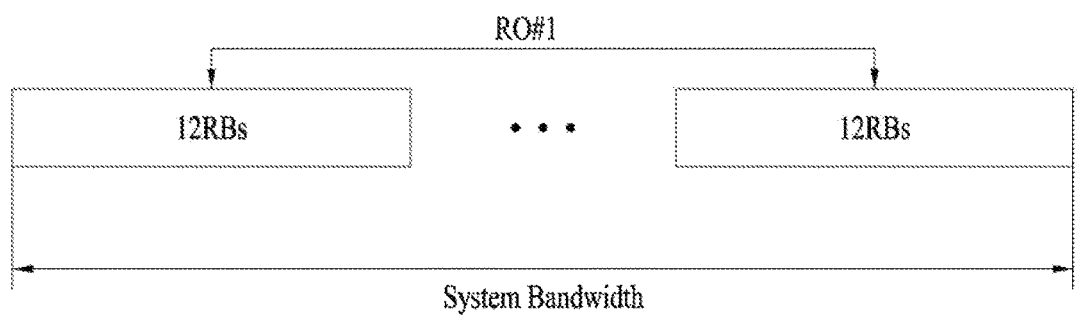
(b)

[Fig. 17]
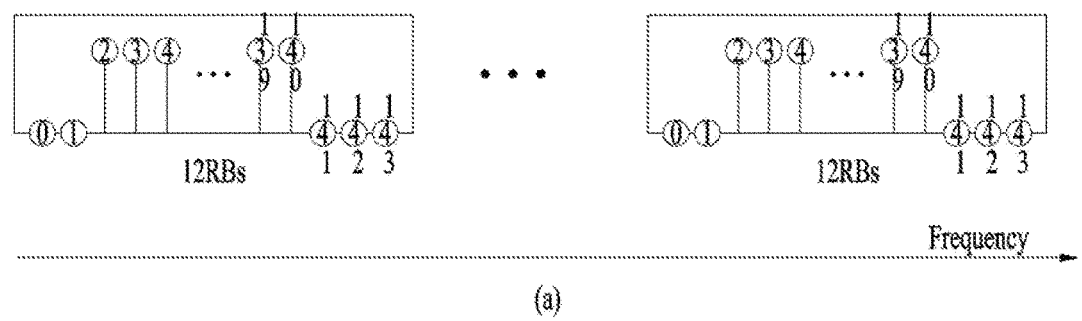
(a)
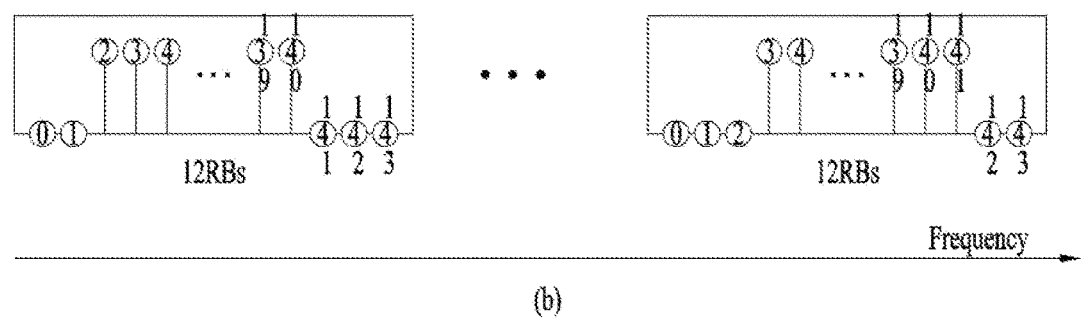
(b)
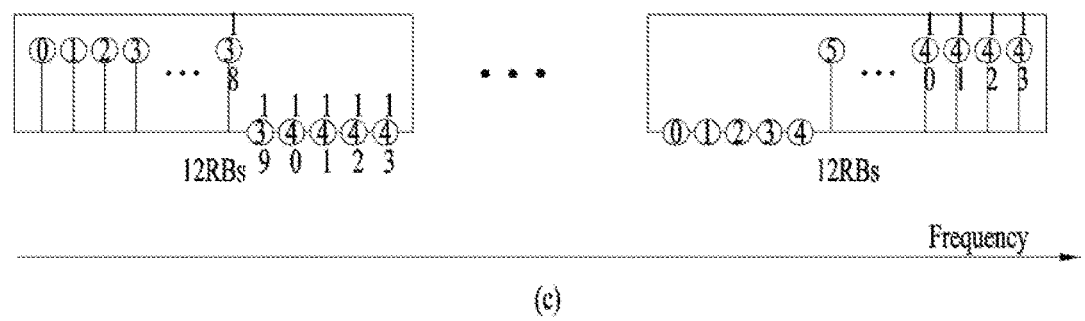
(c)

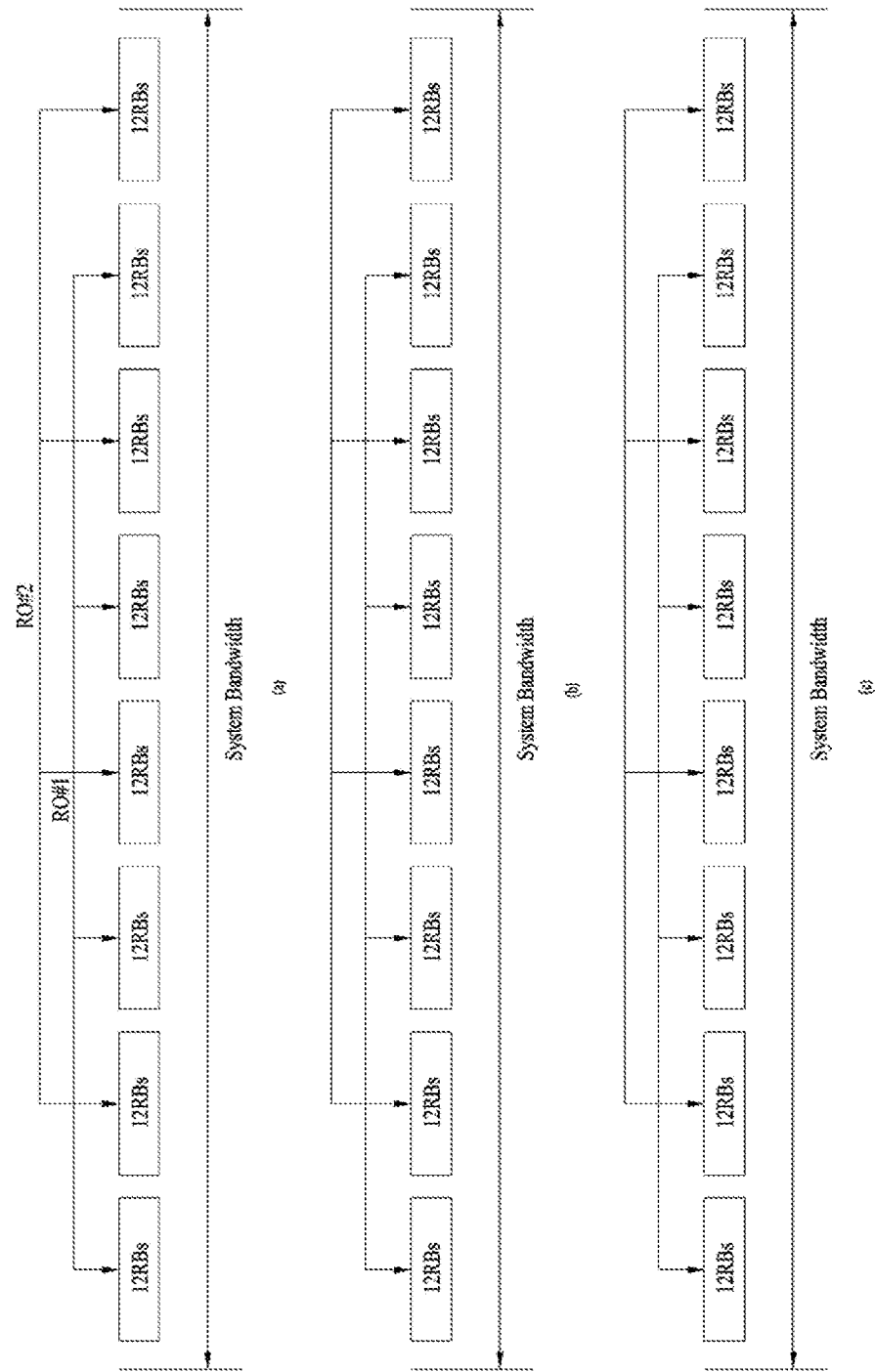
[Fig. 18]

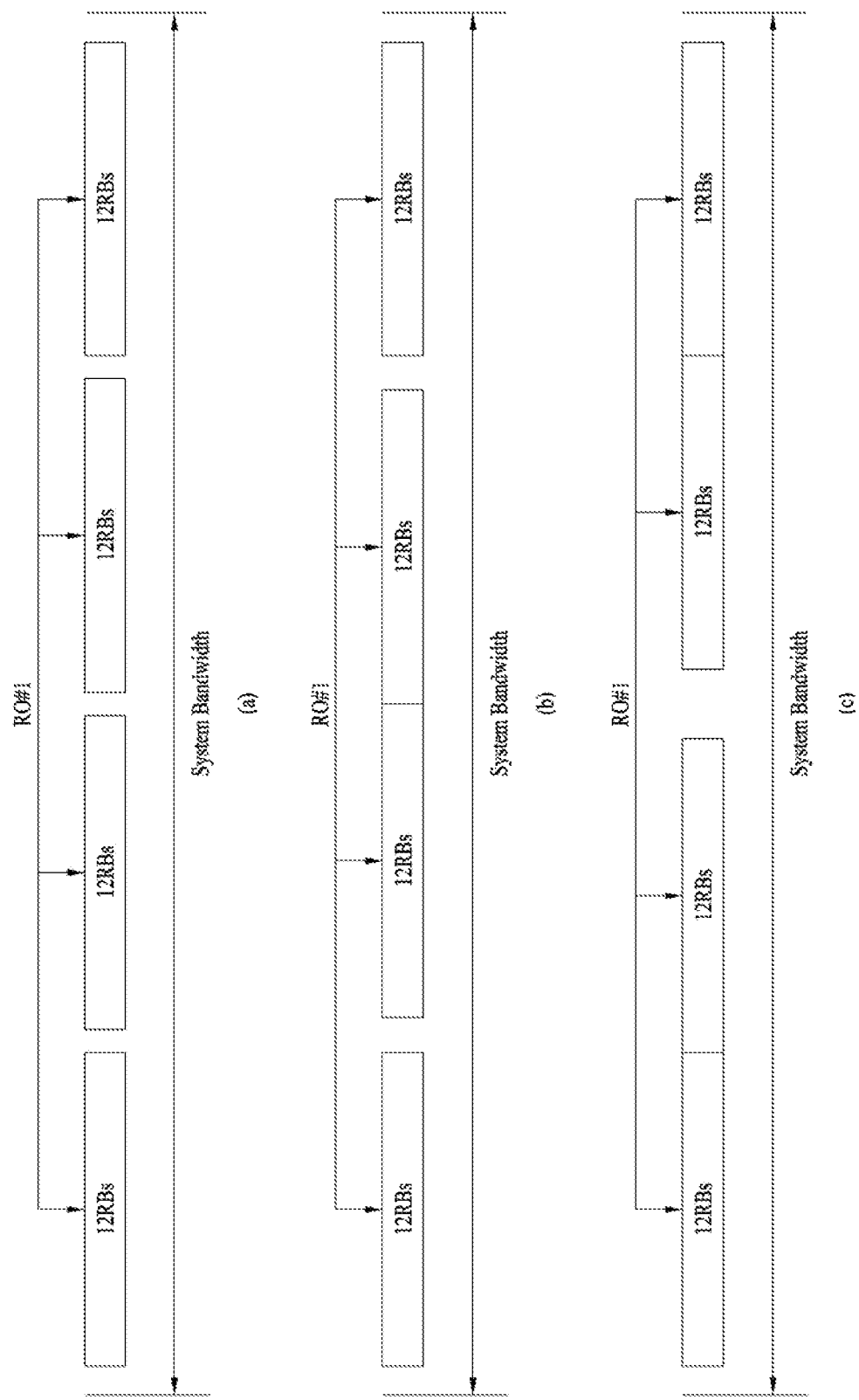
[Fig. 19]

[Fig. 20]

Mapping from *logical* index $i$ to sequence number $u$ for preamble formats with $L_{RA} = 1069$.

| $i$ | Sequence number $u$ in increasing order of $i$ | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | | | | | | | | | | |
| 0 – 19 | 1068 | 2 | 1066 | 4 | 1064 | 6 | 1062 | 8 | 1060 | 10 | 1 | 1067 | 3 | 1065 | 5 | 1063 | 7 | 1061 | 9 | 1059 |
| 20 – 39 | 1058 | 12 | 1056 | 14 | 1054 | 16 | 1052 | 18 | 1050 | 20 | 11 | 1057 | 13 | 1055 | 15 | 1053 | 17 | 1051 | 19 | 1049 |
| 40 – 59 | 1048 | 22 | 1046 | 24 | 1044 | 26 | 1042 | 28 | 1040 | 30 | 21 | 1047 | 23 | 1045 | 25 | 1043 | 27 | 1041 | 29 | 1039 |
| 60 – 79 | 1038 | 32 | 1036 | 34 | 1034 | 36 | 1032 | 38 | 1030 | 40 | 31 | 1037 | 33 | 1035 | 35 | 1033 | 37 | 1031 | 39 | 1029 |
| 80 – 99 | 1028 | 42 | 1026 | 44 | 1024 | 46 | 1022 | 48 | 1020 | 50 | 41 | 1027 | 43 | 1025 | 45 | 1023 | 47 | 1021 | 49 | 1019 |
| 100 – 119 | 1018 | 52 | 1016 | 54 | 1014 | 56 | 1012 | 58 | 1010 | 60 | 51 | 1017 | 53 | 1015 | 55 | 1013 | 57 | 1011 | 59 | 1009 |
| 120 – 139 | 1008 | 62 | 1006 | 64 | 1004 | 66 | 1002 | 68 | 1000 | 70 | 61 | 1007 | 63 | 1005 | 65 | 1003 | 67 | 1001 | 69 | 999 |
| 140 – 159 | 998 | 72 | 996 | 74 | 994 | 76 | 992 | 78 | 990 | 80 | 71 | 997 | 73 | 995 | 75 | 993 | 77 | 991 | 79 | 989 |
| 160 – 179 | 988 | 82 | 986 | 84 | 984 | 86 | 982 | 88 | 980 | 90 | 81 | 987 | 83 | 985 | 85 | 983 | 87 | 981 | 89 | 979 |
| 180 – 199 | 978 | 92 | 976 | 94 | 974 | 96 | 972 | 98 | 970 | 100 | 91 | 977 | 93 | 975 | 95 | 973 | 97 | 971 | 99 | 969 |
| 200 – 219 | 968 | 102 | 966 | 104 | 964 | 106 | 962 | 108 | 960 | 110 | 101 | 967 | 103 | 965 | 105 | 963 | 107 | 961 | 109 | 959 |
| 220 – 239 | 958 | 112 | 956 | 114 | 954 | 116 | 952 | 118 | 950 | 120 | 111 | 957 | 113 | 955 | 115 | 953 | 117 | 951 | 119 | 949 |
| 240 – 259 | 948 | 122 | 946 | 124 | 944 | 126 | 942 | 128 | 940 | 130 | 121 | 947 | 123 | 945 | 125 | 943 | 127 | 941 | 129 | 939 |
| 260 – 279 | 938 | 132 | 936 | 134 | 934 | 136 | 932 | 138 | 930 | 140 | 131 | 937 | 133 | 935 | 135 | 933 | 137 | 931 | 139 | 929 |
| 280 – 299 | 928 | 142 | 926 | 144 | 924 | 146 | 922 | 148 | 920 | 150 | 141 | 927 | 143 | 925 | 145 | 923 | 147 | 921 | 149 | 919 |
| 300 – 319 | 918 | 152 | 916 | 154 | 914 | 156 | 912 | 158 | 910 | 160 | 151 | 917 | 153 | 915 | 155 | 913 | 157 | 911 | 159 | 909 |
| 320 – 339 | 908 | 162 | 906 | 164 | 904 | 166 | 902 | 168 | 900 | 170 | 161 | 907 | 163 | 905 | 165 | 903 | 167 | 901 | 169 | 899 |
| 340 – 359 | 898 | 172 | 896 | 174 | 894 | 176 | 892 | 178 | 890 | 180 | 171 | 897 | 173 | 895 | 175 | 893 | 177 | 891 | 179 | 889 |
| 360 – 379 | 888 | 182 | 886 | 184 | 884 | 186 | 882 | 188 | 880 | 190 | 181 | 887 | 183 | 885 | 185 | 883 | 187 | 881 | 189 | 879 |
| 380 – 399 | 878 | 192 | 876 | 194 | 874 | 196 | 872 | 198 | 870 | 200 | 191 | 877 | 193 | 875 | 195 | 873 | 197 | 871 | 199 | 869 |
| 400 – 419 | 868 | 202 | 866 | 204 | 864 | 206 | 862 | 208 | 860 | 210 | 201 | 867 | 203 | 865 | 205 | 863 | 207 | 861 | 209 | 859 |
| 420 – 439 | 858 | 212 | 856 | 214 | 854 | 216 | 852 | 218 | 850 | 220 | 211 | 857 | 213 | 855 | 215 | 853 | 217 | 851 | 219 | 849 |
| 440 – 459 | 848 | 222 | 846 | 224 | 844 | 226 | 842 | 228 | 840 | 230 | 221 | 847 | 223 | 845 | 225 | 843 | 227 | 841 | 229 | 839 |
| 460 – 479 | 838 | 232 | 836 | 234 | 834 | 236 | 832 | 238 | 830 | 240 | 231 | 837 | 233 | 835 | 235 | 833 | 237 | 831 | 239 | 829 |
| 480 – 499 | 828 | 242 | 826 | 244 | 824 | 246 | 822 | 248 | 820 | 250 | 241 | 827 | 243 | 825 | 245 | 823 | 247 | 821 | 249 | 819 |
| 500 – 519 | 818 | 252 | 816 | 254 | 814 | 256 | 812 | 258 | 810 | 260 | 251 | 817 | 253 | 815 | 255 | 813 | 257 | 811 | 259 | 809 |
| 520 – 539 | 808 | 262 | 806 | 264 | 804 | 266 | 802 | 268 | 800 | 270 | 261 | 807 | 263 | 805 | 265 | 803 | 267 | 801 | 269 | 799 |
| 540 – 559 | 798 | 272 | 796 | 274 | 794 | 276 | 792 | 278 | 790 | 280 | 271 | 797 | 273 | 795 | 275 | 793 | 277 | 791 | 279 | 789 |
| 560 – 579 | 788 | 282 | 786 | 284 | 784 | 286 | 782 | 288 | 780 | 290 | 281 | 787 | 283 | 785 | 285 | 783 | 287 | 781 | 289 | 779 |
| 580 – 599 | 778 | 292 | 776 | 294 | 774 | 296 | 772 | 298 | 770 | 300 | 291 | 777 | 293 | 775 | 295 | 773 | 297 | 771 | 299 | 769 |
| 600 – 619 | 768 | 302 | 766 | 304 | 764 | 306 | 762 | 308 | 760 | 310 | 301 | 767 | 303 | 765 | 305 | 763 | 307 | 761 | 309 | 759 |
| 620 – 639 | 758 | 312 | 756 | 314 | 754 | 316 | 752 | 318 | 750 | 320 | 311 | 757 | 313 | 755 | 315 | 753 | 317 | 751 | 319 | 749 |
| 640 – 659 | 748 | 322 | 746 | 324 | 744 | 326 | 742 | 328 | 740 | 330 | 321 | 747 | 323 | 745 | 325 | 743 | 327 | 741 | 329 | 739 |
| 660 – 679 | 738 | 332 | 736 | 334 | 734 | 336 | 732 | 338 | 730 | 340 | 331 | 737 | 333 | 735 | 335 | 733 | 337 | 731 | 339 | 729 |
| 680 – 699 | 728 | 342 | 726 | 344 | 724 | 346 | 722 | 348 | 720 | 350 | 341 | 727 | 343 | 725 | 345 | 723 | 347 | 721 | 349 | 719 |
| 700 – 719 | 718 | 352 | 716 | 354 | 714 | 356 | 712 | 358 | 710 | 360 | 351 | 717 | 353 | 715 | 355 | 713 | 357 | 711 | 359 | 709 |
| 720 – 739 | 708 | 362 | 706 | 364 | 704 | 366 | 702 | 368 | 700 | 370 | 361 | 707 | 363 | 705 | 365 | 703 | 367 | 701 | 369 | 699 |
| 740 – 759 | 698 | 372 | 696 | 374 | 694 | 376 | 692 | 378 | 690 | 380 | 371 | 697 | 373 | 695 | 375 | 693 | 377 | 691 | 379 | 689 |
| 760 – 779 | 688 | 382 | 686 | 384 | 684 | 386 | 682 | 388 | 680 | 390 | 381 | 687 | 383 | 685 | 385 | 683 | 387 | 681 | 389 | 679 |
| 780 – 799 | 678 | 392 | 676 | 394 | 674 | 396 | 672 | 398 | 670 | 400 | 391 | 677 | 393 | 675 | 395 | 673 | 397 | 671 | 399 | 669 |
| 800 – 819 | 668 | 402 | 666 | 404 | 664 | 406 | 662 | 408 | 660 | 410 | 401 | 667 | 403 | 665 | 405 | 663 | 407 | 661 | 409 | 659 |
| 820 – 839 | 658 | 412 | 656 | 414 | 654 | 416 | 652 | 418 | 650 | 420 | 411 | 657 | 413 | 655 | 415 | 653 | 417 | 651 | 419 | 649 |
| 840 – 859 | 648 | 422 | 646 | 424 | 644 | 426 | 642 | 428 | 640 | 430 | 421 | 647 | 423 | 645 | 425 | 643 | 427 | 641 | 429 | 639 |
| 860 – 879 | 638 | 432 | 636 | 434 | 634 | 436 | 632 | 438 | 630 | 440 | 431 | 637 | 433 | 635 | 435 | 633 | 437 | 631 | 439 | 629 |
| 880 – 899 | 628 | 442 | 626 | 444 | 624 | 446 | 622 | 448 | 620 | 450 | 441 | 627 | 443 | 625 | 445 | 623 | 447 | 621 | 449 | 619 |
| 900 – 919 | 618 | 452 | 616 | 454 | 614 | 456 | 612 | 458 | 610 | 460 | 451 | 617 | 453 | 615 | 455 | 613 | 457 | 611 | 459 | 609 |
| 920 – 939 | 608 | 462 | 606 | 464 | 604 | 466 | 602 | 468 | 600 | 470 | 461 | 607 | 463 | 605 | 465 | 603 | 467 | 601 | 469 | 599 |
| 940 – 959 | 598 | 472 | 596 | 474 | 594 | 476 | 592 | 478 | 590 | 480 | 471 | 597 | 473 | 595 | 475 | 593 | 477 | 591 | 479 | 589 |
| 960 – 979 | 588 | 482 | 586 | 484 | 584 | 486 | 582 | 488 | 580 | 490 | 481 | 587 | 483 | 585 | 485 | 583 | 487 | 581 | 489 | 579 |
| 980 – 999 | 578 | 492 | 576 | 494 | 574 | 496 | 572 | 498 | 570 | 500 | 491 | 577 | 493 | 575 | 495 | 573 | 497 | 571 | 499 | 569 |
| 1000 – 1019 | 568 | 502 | 566 | 504 | 564 | 506 | 562 | 508 | 560 | 510 | 501 | 567 | 503 | 565 | 505 | 563 | 507 | 561 | 509 | 559 |
| 1020 – 1039 | 558 | 512 | 556 | 514 | 554 | 516 | 552 | 518 | 550 | 520 | 511 | 557 | 513 | 555 | 515 | 553 | 517 | 551 | 519 | 549 |
| 1040 – 1059 | 548 | 522 | 546 | 524 | 544 | 526 | 542 | 528 | 540 | 530 | 521 | 547 | 523 | 545 | 525 | 543 | 527 | 541 | 529 | 539 |
| 1060 – 1067 | 538 | 532 | 536 | 534 | - | - | - | - | - | - | 531 | 537 | 533 | 535 | - | - | - | - | - | - |

[Fig. 21]

$N_{CS}$ for preamble formats with $\Delta f^{RA} = 15 \cdot 2^0$ kHz. ($I_{RA}$ =1069)

| zero CorrelationZoneConfig | $N_{CS}$ value for unrestricted set |
|---|---|
| 0 | 0 |
| 1 | 16 |
| 2 | 32 |
| 3 | 48 |
| 4 | 64 |
| 5 | 80 |
| 6 | 96 |
| 7 | 106 |
| 8 | 118 |
| 9 | 133 |
| 10 | 152 |
| 11 | 178 |
| 12 | 213 |
| 13 | 267 |
| 14 | 356 |
| 15 | 534 |

[Fig. 22]

Mapping from *logical index* $i$ to sequence number $u$ for preamble formats with $L_{RA} = 541$.

| $i$ | | | | | | Sequence number $u$ in increasing order of $i$ | | | | | |
|---|---|---|---|---|---|---|---|---|---|---|---|
| | 1 | 2 | 3 | 4 | 5 | 6 | 7 | 8 | 9 | 10 | |
| 0 – 19 | 540 | 539 | 538 | 537 | 536 | 535 | 534 | 533 | 532 | 531 | |
| | 1 | 2 | 3 | 4 | 5 | 6 | 7 | 8 | 9 | 10 | |
| 20 – 39 | 530 | 529 | 528 | 527 | 526 | 525 | 524 | 523 | 522 | 521 | |
| | 11 | 12 | 13 | 14 | 15 | 16 | 17 | 18 | 19 | 20 | |
| 40 – 59 | 520 | 519 | 518 | 517 | 516 | 515 | 514 | 513 | 512 | 511 | |
| | 21 | 22 | 23 | 24 | 25 | 26 | 27 | 28 | 29 | 30 | |
| 60 – 79 | 510 | 509 | 508 | 507 | 506 | 505 | 504 | 503 | 502 | 501 | |
| | 31 | 32 | 33 | 34 | 35 | 36 | 37 | 38 | 39 | 40 | |
| 80 – 99 | 500 | 499 | 498 | 497 | 496 | 495 | 494 | 493 | 492 | 491 | |
| | 41 | 42 | 43 | 44 | 45 | 46 | 47 | 48 | 49 | 50 | |
| 100 – 119 | 490 | 489 | 488 | 487 | 486 | 485 | 484 | 483 | 482 | 481 | |
| | 51 | 52 | 53 | 54 | 55 | 56 | 57 | 58 | 59 | 60 | |
| 120 – 139 | 480 | 479 | 478 | 477 | 476 | 475 | 474 | 473 | 472 | 471 | |
| | 61 | 62 | 63 | 64 | 65 | 66 | 67 | 68 | 69 | 70 | |
| 140 – 159 | 470 | 469 | 468 | 467 | 466 | 465 | 464 | 463 | 462 | 461 | |
| | 71 | 72 | 73 | 74 | 75 | 76 | 77 | 78 | 79 | 80 | |
| 160 – 179 | 460 | 459 | 458 | 457 | 456 | 455 | 454 | 453 | 452 | 451 | |
| | 81 | 82 | 83 | 84 | 85 | 86 | 87 | 88 | 89 | 90 | |
| 180 – 199 | 450 | 449 | 448 | 447 | 446 | 445 | 444 | 443 | 442 | 441 | |
| | 91 | 92 | 93 | 94 | 95 | 96 | 97 | 98 | 99 | 100 | |
| 200 – 219 | 440 | 439 | 438 | 437 | 436 | 435 | 434 | 433 | 432 | 431 | |
| | 101 | 102 | 103 | 104 | 105 | 106 | 107 | 108 | 109 | 110 | |
| 220 – 239 | 430 | 429 | 428 | 427 | 426 | 425 | 424 | 423 | 422 | 421 | |
| | 111 | 112 | 113 | 114 | 115 | 116 | 117 | 118 | 119 | 120 | |
| 240 – 259 | 420 | 419 | 418 | 417 | 416 | 415 | 414 | 413 | 412 | 411 | |
| | 121 | 122 | 123 | 124 | 125 | 126 | 127 | 128 | 129 | 130 | |
| 260 – 279 | 410 | 409 | 408 | 407 | 406 | 405 | 404 | 403 | 402 | 401 | |
| | 131 | 132 | 133 | 134 | 135 | 136 | 137 | 138 | 139 | 140 | |
| 280 – 299 | 400 | 399 | 398 | 397 | 396 | 395 | 394 | 393 | 392 | 391 | |
| | 141 | 142 | 143 | 144 | 145 | 146 | 147 | 148 | 149 | 150 | |
| 300 – 319 | 390 | 389 | 388 | 387 | 386 | 385 | 384 | 383 | 382 | 381 | |
| | 151 | 152 | 153 | 154 | 155 | 156 | 157 | 158 | 159 | 160 | |
| 320 – 339 | 380 | 379 | 378 | 377 | 376 | 375 | 374 | 373 | 372 | 371 | |
| | 161 | 162 | 163 | 164 | 165 | 166 | 167 | 168 | 169 | 170 | |
| 340 – 359 | 370 | 369 | 368 | 367 | 366 | 365 | 364 | 363 | 362 | 361 | |
| | 171 | 172 | 173 | 174 | 175 | 176 | 177 | 178 | 179 | 180 | |
| 360 – 379 | 360 | 359 | 358 | 357 | 356 | 355 | 354 | 353 | 352 | 351 | |
| | 181 | 182 | 183 | 184 | 185 | 186 | 187 | 188 | 189 | 190 | |
| 380 – 399 | 350 | 349 | 348 | 347 | 346 | 345 | 344 | 343 | 342 | 341 | |
| | 191 | 192 | 193 | 194 | 195 | 196 | 197 | 198 | 199 | 200 | |
| 400 – 419 | 340 | 339 | 338 | 337 | 336 | 335 | 334 | 333 | 332 | 331 | |
| | 201 | 202 | 203 | 204 | 205 | 206 | 207 | 208 | 209 | 210 | |
| 420 – 439 | 330 | 329 | 328 | 327 | 326 | 325 | 324 | 323 | 322 | 321 | |
| | 211 | 212 | 213 | 214 | 215 | 216 | 217 | 218 | 219 | 220 | |
| 440 – 459 | 320 | 319 | 318 | 317 | 316 | 315 | 314 | 313 | 312 | 311 | |
| | 221 | 222 | 223 | 224 | 225 | 226 | 227 | 228 | 229 | 230 | |
| 460 – 479 | 310 | 309 | 308 | 307 | 306 | 305 | 304 | 303 | 302 | 301 | |
| | 231 | 232 | 233 | 234 | 235 | 236 | 237 | 238 | 239 | 240 | |
| 480 – 499 | 300 | 299 | 298 | 297 | 296 | 295 | 294 | 293 | 292 | 291 | |
| | 241 | 242 | 243 | 244 | 245 | 246 | 247 | 248 | 249 | 250 | |
| 500 – 519 | 290 | 289 | 288 | 287 | 286 | 285 | 284 | 283 | 282 | 281 | |
| | 251 | 252 | 253 | 254 | 255 | 256 | 257 | 258 | 259 | 260 | |
| 520 – 539 | 280 | 279 | 278 | 277 | 276 | 275 | 274 | 273 | 272 | 271 | |
| | 261 | 262 | 263 | 264 | 265 | 266 | 267 | 268 | 269 | 270 | |

[Fig. 23]

$N_{CS}$ for preamble formats with $\Delta f^{RA} = 15 \cdot 2^1$ kHz. ($L_{RA}$ =541)

| zero CorrelationZoneConfig | $N_{CS}$ value for unrestricted set |
|---|---|
| 0 | 0 |
| 1 | 8 |
| 2 | 16 |
| 3 | 24 |
| 4 | 32 |
| 5 | 40 |
| 6 | 48 |
| 7 | 54 |
| 8 | 60 |
| 9 | 67 |
| 10 | 77 |
| 11 | 90 |
| 12 | 108 |
| 13 | 135 |
| 14 | 180 |
| 15 | 270 |

[Fig. 24]

Mapping from logical index $i$ to sequence number $u$ for preamble formats with $L_{RA} = 269$.

| $i$ | | | | | | Sequence number $u$ in increasing order of $i$ | | | | | |
|---|---|---|---|---|---|---|---|---|---|---|---|
|  | 1 | 268 | 2 | 267 | 3 | 266 | 4 | 265 | 5 | 264 | 6 | 263 | 7 | 262 | 8 | 261 | 9 | 260 | 10 | 259 |
| 0 – 19 | 1 | 268 | 2 | 267 | 3 | 266 | 4 | 265 | 5 | 264 | 6 | 263 | 7 | 262 | 8 | 261 | 9 | 260 | 10 | 259 |
| 20 – 39 | 11 | 258 | 12 | 257 | 13 | 256 | 14 | 255 | 15 | 254 | 16 | 253 | 17 | 252 | 18 | 251 | 19 | 250 | 20 | 249 |
| 40 – 59 | 21 | 248 | 22 | 247 | 23 | 246 | 24 | 245 | 25 | 244 | 26 | 243 | 27 | 242 | 28 | 241 | 29 | 240 | 30 | 239 |
| 60 – 79 | 31 | 238 | 32 | 237 | 33 | 236 | 34 | 235 | 35 | 234 | 36 | 233 | 37 | 232 | 38 | 231 | 39 | 230 | 40 | 229 |
| 80 – 99 | 41 | 228 | 42 | 227 | 43 | 226 | 44 | 225 | 45 | 224 | 46 | 223 | 47 | 222 | 48 | 221 | 49 | 220 | 50 | 219 |
| 100 – 119 | 51 | 218 | 52 | 217 | 53 | 216 | 54 | 215 | 55 | 214 | 56 | 213 | 57 | 212 | 58 | 211 | 59 | 210 | 60 | 209 |
| 120 – 139 | 61 | 208 | 62 | 207 | 63 | 206 | 64 | 205 | 65 | 204 | 66 | 203 | 67 | 202 | 68 | 201 | 69 | 200 | 70 | 199 |
| 140 – 159 | 71 | 198 | 72 | 197 | 73 | 196 | 74 | 195 | 75 | 194 | 76 | 193 | 77 | 192 | 78 | 191 | 79 | 190 | 80 | 189 |
| 160 – 179 | 81 | 188 | 82 | 187 | 83 | 186 | 84 | 185 | 85 | 184 | 86 | 183 | 87 | 182 | 88 | 181 | 89 | 180 | 90 | 179 |
| 180 – 199 | 91 | 178 | 92 | 177 | 93 | 176 | 94 | 175 | 95 | 174 | 96 | 173 | 97 | 172 | 98 | 171 | 99 | 170 | 100 | 169 |
| 200 – 219 | 101 | 168 | 102 | 167 | 103 | 166 | 104 | 165 | 105 | 164 | 106 | 163 | 107 | 162 | 108 | 161 | 109 | 160 | 110 | 159 |
| 220 – 239 | 111 | 158 | 112 | 157 | 113 | 156 | 114 | 155 | 115 | 154 | 116 | 153 | 117 | 152 | 118 | 151 | 119 | 150 | 120 | 149 |
| 240 – 259 | 121 | 148 | 122 | 147 | 123 | 146 | 124 | 145 | 125 | 144 | 126 | 143 | 127 | 142 | 128 | 141 | 129 | 140 | 130 | 139 |
| 260 – 267 | 131 | 138 | 132 | 137 | 133 | 136 | 134 | 135 | - | - | - | - | - | - | - | - | - | - | - | - |

【Fig. 25】

$N_{CS}$ for preamble formats with $\Delta f^{RA} = 15 \cdot 2^2$ kHz. ($L_{RA}$ =269)

| zero CorrelationZoneConfig | $N_{CS}$ value for unrestricted set |
|---|---|
| 0 | 0 |
| 1 | 4 |
| 2 | 8 |
| 3 | 12 |
| 4 | 16 |
| 5 | 20 |
| 6 | 24 |
| 7 | 26 |
| 8 | 29 |
| 9 | 33 |
| 10 | 38 |
| 11 | 44 |
| 12 | 53 |
| 13 | 67 |
| 14 | 89 |
| 15 | 134 |

【Fig. 26】
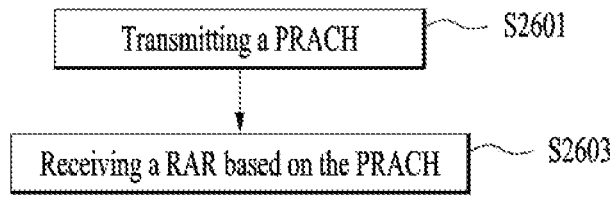
【Fig. 27】
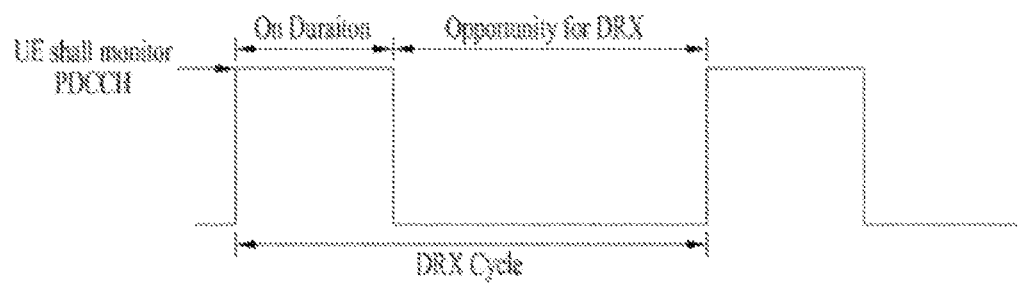
【Fig. 28】
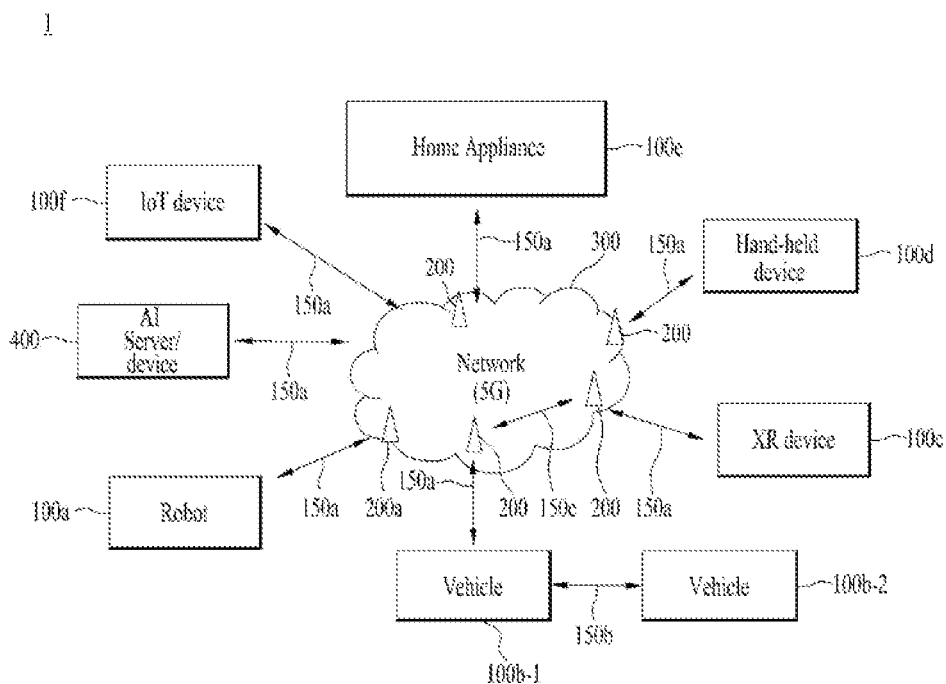

【Fig. 29】
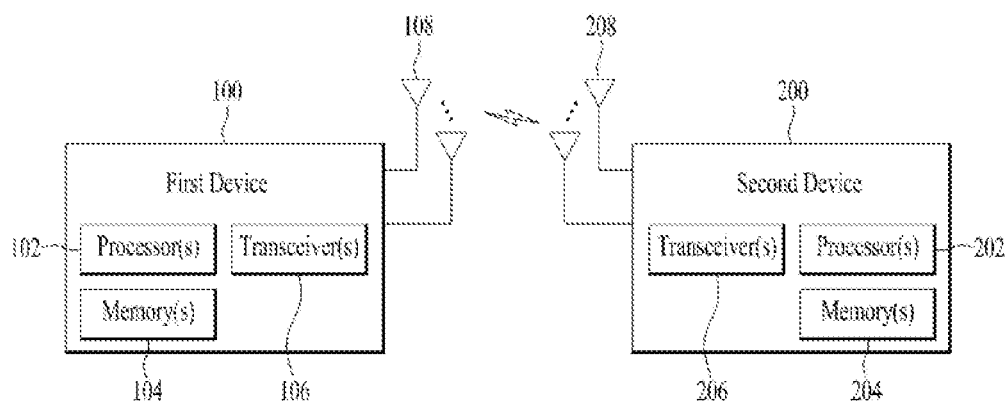
【Fig. 30】
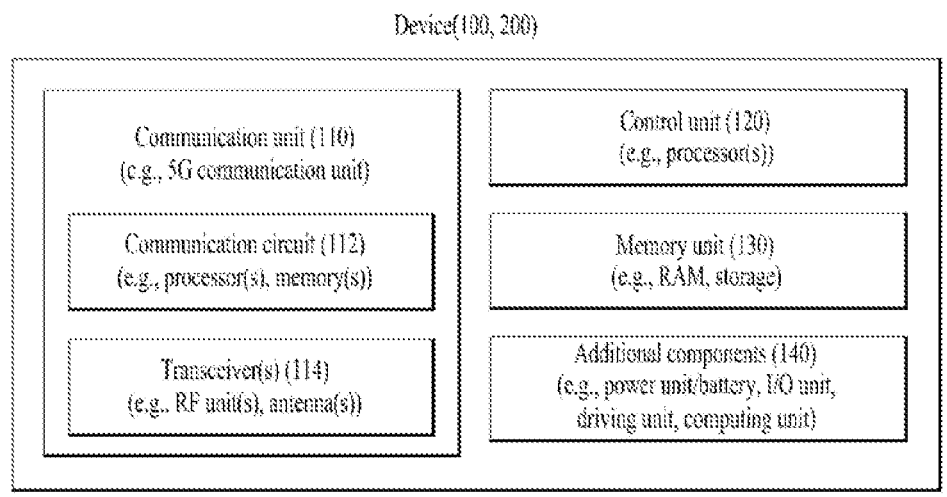

[Fig. 31]
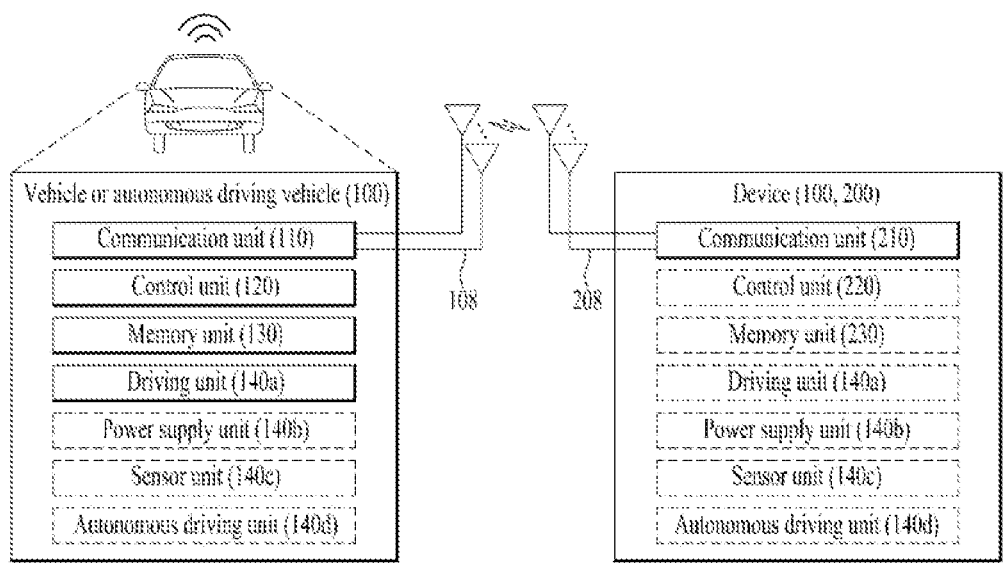

METHOD AND APPARATUS FOR TRANSMITTING AND RECEIVING SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2020/002030, filed on Feb. 13, 2020, which claims the benefit of earlier filing date and right of priority to Korean Patent Application Nos. 10-2019-0018029, filed on Feb. 15, 2019, 10-2019-0036406, filed on Mar. 28, 2019, 10-2019-0052598, filed on May 3, 2019, and 10-2019-0055323, filed on May 10, 2019, and also claims the benefit of U.S. Provisional Application No. 62/808,878, filed on Feb. 22, 2019, the contents of which are all incorporated by reference herein in their entirety.

TECHNICAL FIELD

The present disclosure relates to a method and apparatus for use in a wireless communication system, and more particularly, to a random access method for use in a wireless communication system and apparatus therefor.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

DISCLOSURE

Technical Problem

Provided are a method and apparatus for performing a random access procedure efficiently in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus for transmitting and receiving a signal in a wireless communication system.

In an aspect of the present disclosure, a method of transmitting and receiving a signal by a user equipment (UE) in a wireless communication system is provided. The method may include: transmitting a first physical random access channel (PRACH); and receiving a random access response (RAR) based on the first PRACH. The first PRACH may be configured by repeatedly mapping a PRACH sequence of a specific length a plurality of times in a frequency domain, and the PRACH sequence may be mapped to 12 consecutive physical resource blocks (PRBs).

In another aspect of the present disclosure, a UE configured to transmit and receiving a signal in a wireless communication system is provided. The UE may include: at least one transceiver; at least one processor; and at least one memory operably connected to the at least one processor and configured to store instructions that, when executed, cause the at least one processor to perform operations. The operations may include: transmitting a first PRACH; and receiving an RAR based on the first PRACH. The first PRACH may be configured by repeatedly mapping a PRACH sequence of a specific length a plurality of times in a frequency domain, and the PRACH sequence may be mapped to 12 consecutive PRBs.

In another aspect of the present disclosure, a method of transmitting and receiving a signal by a base station in a wireless communication system is provided. The method may include: receiving a first PRACH; and transmitting an RAR based on the first PRACH. The first PRACH may be configured by repeatedly mapping a PRACH sequence of a specific length a plurality of times in a frequency domain, and the PRACH sequence may be mapped to 12 consecutive PRBs.

In another aspect of the present disclosure, a communication apparatus configured to transmit a signal in a wireless communication system is provided. The communication apparatus may include at least one transceiver; at least one processor; and at least one computer memory operably connected to the at least one processor and configured to store instructions that, when executed, cause the at least one processor to perform operations. The operations may include: transmitting a first PRACH; and receiving an RAR based on the first PRACH. The first PRACH may be configured by repeatedly mapping a PRACH sequence of a specific length a plurality of times in a frequency domain, and the PRACH sequence may be mapped to 12 consecutive PRBs.

In still another aspect of the present disclosure, an apparatus for a UE is provided. The apparatus may include: at least one processor; and at least one computer memory operably connected to the at least one processor and configured to store instructions that, when executed, cause the at least one processor to perform operations. The operations may include: transmitting a first PRACH; and receiving an RAR based on the first PRACH. The first PRACH may be configured by repeatedly mapping a PRACH sequence of a specific length a plurality of times in a frequency domain, and the PRACH sequence may be mapped to 12 consecutive PRBs.

In a further aspect of the present disclosure, a computer-readable storage medium configured to store at least one computer program that, when executed, cause the at least one processor to perform operations. The operations may include: transmitting a first PRACH; and receiving an RAR based on the first PRACH. The first PRACH may be configured by repeatedly mapping a PRACH sequence of a specific length a plurality of times in a frequency domain, and the PRACH sequence may be mapped to 12 consecutive PRBs.

In the methods and apparatuses, frequency-domain locations of the PRACH sequences may be determined based on a subcarrier spacing (SCS).

In the methods and apparatuses, the specific length may be 139, and zero padding may be performed on two resource elements (REs) with lowest indices and three REs with highest indices among 144 REs included in the 12 consecutive PRBs. When the PRACH sequence is repeatedly mapped the plurality of times in the frequency domain, the zero padding may be performed at same locations in each of the 12 consecutive PRBs.

In the methods and apparatuses, one random access channel occasion (RO) may be configured based on the PRACH sequences repeated the plurality of times.

In the methods and apparatuses, the one RO may be configured to be available for a second PRACH, and the second PRACH may be configured without repeating the PRACH sequence of the specific length mapped to the 12 consecutive PRBs in the frequency domain.

In the methods and apparatuses, a different root index and/or a different cyclic shift (CS) value may be configured for each of the PRACH sequences.

In the methods and apparatuses, among random access preamble identifiers (RAPIDs) related to the one RO, several RAPIDs may be used for the first PRACH, and remaining RAPIDs may be used for the second PRACH.

In the method or the device, the communication device may include an autonomous driving vehicle communicable with at least a user equipment (UE), a network, and another autonomous driving vehicle other than the communication device.

The above-described aspects of the present disclosure are only some of the preferred embodiments of the present disclosure, and various embodiments reflecting the technical features of the present disclosure may be derived and understood from the following detailed description of the present disclosure by those skilled in the art.

Advantageous Effects

According to an embodiment of the present disclosure, a communication device may perform a random access procedure more efficiently by an operation differentiated from a legacy operation.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 1 illustrates a radio frame structure;

FIG. 2 illustrates a resource grid during the duration of a slot;

FIG. 3 illustrates a self-contained slot structure;

FIG. 4 illustrates a wireless communication system supporting an unlicensed band;

FIG. 5 illustrates a method of occupying resources in an unlicensed band;

FIGS. 6 and 7 are flowcharts illustrating channel access procedures (CAPs) for signal transmission in an unlicensed band;

FIGS. 8 and 9 are a diagram illustrating a signal flow for a random access procedure;

FIGS. 10 to 27 illustrates random access procedures according to an embodiment of the present disclosure;

FIGS. 28 to 31 illustrate devices according to an embodiment of the present disclosure.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

3GPP LTE 36.211: Physical channels and modulation 36.212: Multiplexing and channel coding 36.213: Physical layer procedures 36.300: Overall description 36.331: Radio Resource Control (RRC)

3GPP NR 38.211: Physical channels and modulation 38.212: Multiplexing and channel coding 38.213: Physical layer procedures for control 38.214: Physical layer procedures for data 38.300: NR and NG-RAN Overall Description 38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols.

When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (n = 4) | 14 | 160 | 16 |

*$N^{slot}_{symb}$: number of symbols in a slot
*$N^{frame, u}_{slot}$: number of slots in a frame
*$N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
   2. UL only configuration
   3. Mixed UL-DL configuration
      DL region+Guard period (GP)+UL control region
      DL control region+GP+UL region
      DL region: (i) DL data region, (ii) DL control region+DL data region
      UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

In the present disclosure, a base station (BS) may be, for example, a gNode B (gNB).

1. Wireless Communication System Supporting Unlicensed Band

FIG. 4 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a UE and a BS transmit and receive signals in a carrier-aggregated LCC and UCC as illustrated in FIG. 4(a), the LCC may be configured as a primary CC (PCC) and the UCC may be configured as a secondary CC (SCC). As illustrated in FIG. 4(b), the UE and the BS may transmit and receive signals in one UCC or a plurality of carrier-aggregated UCCs. That is, the UE and the BS may transmit and receive signals only in UCC(s) without an LCC.

(Unless otherwise specified), a signal transmission/reception operation in an unlicensed band described in the present disclosure may be performed based on all the above-described deployment scenarios.

Radio Frame Structure for Unlicensed Band

Recently, the 3GPP standardization group has proceeded to standardize a 5G system named New RAT (NR). The NR system has been designed to provide a plurality of logical networks in a single physical system and support services with various requirements (e.g., eMBB, mMTC, URLLC, etc.) by changing a transmission time interval (TTI) and/or an OFDM numerology (e.g., OFDM symbol duration, subcarrier spacing (SCS), and so on). In recent years, data traffic has significantly increased with the advent of smart devices. Thus, the 3GPP NR system has also considered the use of an unlicensed band for cellular communication as in LAA of the legacy 3GPP LTE system. However, unlike the LAA, a NR cell in the unlicensed-band (NR U-cell) aims to support standalone operation. For example, PUCCH, PUSCH, and PRACH transmissions at the UE may be supported.

The NR frame structure of FIG. 1 may be used for an operation in an unlicensed band. The configuration of OFDM symbols occupied for UL/DL signal transmission in the frame structure for the unlicensed band may be configured by the BS. The term OFDM symbol may be replaced with SC-FDM(A) symbol.

In the following description, a plurality of CCs (CC indexes) may be replaced with a plurality of BWPs (BWP indexes) configured in one (or more) CC(s) or (serving) cell(s), or a plurality of CCs/cells each including a plurality of BWPs (i.e., CC (index)-BWP (index) combinations). In this situation, the proposed principle/operations of the present disclosure are also applicable in the same manner.

FIG. 5 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP or CCA.

Specifically, for DL reception/UL transmission in an unlicensed band, one or more of the following channel access procedure (CAP) methods may be used in a wireless communication system related to the present disclosure.

Method of Transmitting DL Signal in Unlicensed Band

To transmit a DL signal in an unlicensed band, the BS may indicate the configuration of OFDM symbols used in subframe #n to the UE by signaling. The term subframe may be replaced with slot or time unit (TU).

The BS may perform one of the following unlicensed band access procedures (e.g., CAPs) to transmit a DL signal in the unlicensed band.

(1) First DL CAP Method

FIG. 6 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S1210). The BS may randomly select a backoff counter N within a contention window (CW) according to step 1. N is set to an initial value $N_{init}$ (S1220). $N_{init}$ is a random value selected from the values between 0 and $CW_p$. Subsequently, when the backoff counter value N is 0 according to step 4 (S1230; Y), the BS terminates the CAP (S1232). The BS may then perform a Tx burst transmission including transmission of a PDSCH/PDCCH/EPDCCH (S1234). On the contrary, when the backoff counter value N is not 0 (S1230; N), the BS decrements the backoff counter value by 1 according to step 2 (S1240). Subsequently, the BS checks whether the channel of U-cell (s) is idle (S1250). If the channel is idle (S1250; Y), the BS determines whether the backoff counter value is 0 (S1230). On the contrary, when the channel is not idle, that is, the channel is busy (S1250; N), the BS determines whether the channel is idle during a longer defer duration $T_d$ (25 usec or longer) than a slot duration (e.g., 9 usec) according to step 5 (S1260). If the channel is idle during the defer duration (S1270; Y), the BS may resume the CAP. The defer duration may include a 16-usec duration and the immediately following $m_p$ consecutive slot durations (e.g., each being 9 usec). On the contrary, if the channel is busy during the defer duration (S1270; N), the BS re-checks whether the channel of the U-cell(s) is idle during a new defer duration by performing step S1260 again.

Table 4 illustrates that mp, a minimum CW, a maximum CW, a maximum channel occupancy time (MCOT), and an allowed CW size applied to a CAP vary according to channel access priority classes.

TABLE 4

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

(2) Second DL CAP Method

The BS may perform a DL signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration $T_{drs}$=25 us. $T_{drs}$ includes a duration $T_f$ (=16 us) following one sensing slot duration $T_{sl}$(=9 us).

(3) Third DL CAP Method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining $N_{init}$ for a specific carrier.

Method of Transmitting UL Signal in Unlicensed Band

For a UL signal transmission in an unlicensed band, the BS may transmit information about a UL transmission period to the UE by signaling.

For a UL signal transmission in the unlicensed band, the UE performs a contention-based CAP. For example, the UE may perform a Type 1 CAP or a Type 2 CAP for UL signal transmission in the U-band. In general, the UE may perform a CAP configured/indicated by the BS (e.g., Type 1 CAP or Type 2 CAP) for the UL signal transmission.

(1) Type 1 UL CAP Method

FIG. 7 is a flowchart illustrating UE's Type 1 CAP operation for UL signal transmission.

To transmit a signal in the U-band, the UE may initiate a CAP (S1510). The UE may randomly select a backoff counter N within a contention window (CW) according to step 1. In this case, N is set to an initial value $N_{init}$ (S1520). $N_{init}$ may have a random value between 0 and $CW_p$. If it is determined according to step 4 that the backoff counter value (N) is 0 (YES in S1530), the UE terminates the CAP (S1532). Then, the UE may perform Tx burst transmission (S1534). If the backoff counter value is non-zero (NO in S1530), the UE decreases the backoff counter value by 1 according to step 2 (S1540). The UE checks whether the channel of U-cell(s) is idle (S1550). If the channel is idle (YES in S1550), the UE checks whether the backoff counter value is 0 (S1530). On the contrary, if the channel is not idle in S1550, that is, if the channel is busy (NO in S1550), the UE checks whether the corresponding channel is idle for a defer duration $T_d$ (longer than or equal to 25 usec), which is longer than a slot duration (e.g., 9 usec), according to step 5 (S1560). If the channel is idle for the defer duration (YES in S1570), the UE may resume the CAP. Here, the defer duration may include a duration of 16 usec and $m_p$ consecutive slot durations (e.g., 9 usec), which immediately follows the duration of 16 usec. If the channel is busy for the defer duration (NO in S1570), the UE performs step S1560 again to check whether the channel is idle for a new defer duration.

Table 5 shows that the values of $m_p$, a minimum CW, a maximum CW, a maximum channel occupancy time (MCOT), and allowed CW sizes, which are applied to the CAP, vary depending on channel access priority classes.

TABLE 5

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |

TABLE 5-continued

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

The size of a CW applied to the Type 1 UL CAP may be determined in various ways. For example, the CW size may be adjusted depending on whether the value of of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min,p}$ for every priority class p∈{1,2,3,4}. Otherwise, the UE may increase $CW_p$ for every priority class p∈{1,2,3,4} to a next higher allowed value.

A reference subframe (or slot) $n_{ref}$ is determined as follows.

When the UE receives a UL grant in a subframe (or slot) $n_g$ and transmits a UL-SCH in subframes (or slots) $n_0$, $n_1$, ... $n_w$, starting from the subframe (or slot) $n_0$ without a gap (the subframe (or slot) $n_w$ is the most recent subframe (or slot) before a subframe (or slot) $n_g$-3 in which the UE has transmitted a UL-SCH based on a Type 1 CAP), the reference subframe (or slot) $n_{ref}$ is the subframe (or slot) $n_0$.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

2. Random Access Procedure

FIG. 8 illustrates random access procedures. FIG. 8(a) illustrates the contention-based random access procedure, and FIG. 8(b) illustrates the dedicated random access procedure.

Referring to FIG. 8(a), the contention-based random access procedure includes the following four steps. The messages transmitted in steps 1 to 4 may be referred to as message 1 (Msg1) to message 4 (Msg4), respectively.

Step 1: The UE transmits an RACH preamble on a PRACH.

Step 2: The UE receives a random access response (RAR) on a DL-SCH from the BS.

Step 3: The UE transmits a Layer 2 (L2)/Layer 3 (L3) message on a UL-SCH to the BS.

Step 4: The UE receives a contention resolution message on the DL-SCH from the BS.

The UE may receive random access information in system information from the BS.

When the UE needs random access, the UE transmits an RACH preamble to the BS as in step 1. The BS may identify each RACH preamble by a time/frequency resource (RACH occasion (RO)) in which the RACH preamble is transmitted, and a preamble index (PI).

Upon receipt of the RACH preamble from the UE, the BS transmits an RAR message to the UE as in step 2. To receive the RAR message, the UE monitors an L1/L2 PDCCH with a cyclic redundancy check (CRC) masked with a random access-RNTI (RA-RNTI), including scheduling information for the RAR message, within a preconfigured time window (e.g., ra-ResponseWindow). The PDCCH masked with the RA-RNTI may be transmitted only in a common search space. When receiving a scheduling signal masked with the RA-RNTI, the UE may receive an RAR message on a PDSCH indicated by the scheduling information. The UE then checks whether there is RAR information directed to the UE in the RAR message. The presence or absence of the RAR information directed to the UE may be determined by checking whether there is a random access preamble ID (RAPID) for the preamble transmitted by the UE. The index of the preamble transmitted by the UE may be identical to the RAPID. The RAR information includes the index of the corresponding RACH preamble, timing offset information (e.g., timing advance command (TAC)) for UL synchronization, UL scheduling information (e.g., UL grant) for Msg3 transmission, and UE temporary identification information (e.g., temporary-C-RNTI (TC-RNTI)).

Upon receipt of the RAR information, the UE transmits UL-SCH data (Msg3) on a PUSCH according to the UL scheduling information and the timing offset value, as in step 3. Msg3 may include the ID (or global ID) of the UE. Alternatively, Msg3 may include RRC connection request-related information (e.g., RRCSetupRequest message) for initial access. In addition, Msg3 may include a buffer status report (BSR) on the amount of data available for transmission at the UE.

After receiving the UL-SCH data, the BS transmits a contention resolution message (Msg4) to the UE as in step 4. When the UE receives the contention resolution message and succeeds in contention resolution, the TC-RNTI is changed to a C-RNTI. Msg4 may include the ID of the UE and/or RRC connection-related information (e.g., an RRC-Setup message). When information transmitted in Msg3 does not match information received in Msg4, or when the UE has not received Msg4 for a predetermined time, the UE may retransmit Msg3, determining that the contention resolution has failed.

Referring to FIG. 8(b), the dedicated random access procedure includes the following three steps. Messages transmitted in steps 0 to 2 may be referred to as Msg0 to Msg2, respectively. The BS may trigger the dedicated random access procedure by a PDCCH serving the purpose of commanding RACH preamble transmission (hereinafter, referred to as a PDCCH order).

Step 0: The BS allocates an RACH preamble to the UE by dedicated signaling.
Step 1: The UE transmits the RACH preamble on a PRACH.
Step 2: The UE receives an RAR on a DL-SCH from the BS.

Steps 1 and 2 of the dedicated random access procedure may be the same as steps 1 and 2 of the contention-based random access procedure.

In NR, DCI format 1_0 is used to initiate a non-contention-based random access procedure by a PDCCH order. DCI format 1_0 is used to schedule a PDSCH in one DL cell. When the CRC of DCI format 1_0 is scrambled with a C-RNTI, and all bits of a "Frequency domain resource assignment" field are 1s, DCI format 1_0 is used as a PDCCH order indicating a random access procedure. In this case, the fields of DCI format 1_0 are configured as follows.

RA preamble index: 6 bits
UL/supplementary UL (SUL) indicator: 1 bit. When the bits of the RA preamble index are all non-zeroes and SUL is configured for the UE in the cell, the UL/SUL indicator indicates a UL carrier in which a PRACH is transmitted in the cell. Otherwise, it is reserved.
SSB (Synchronization Signal/Physical Broadcast Channel) index: 6 bits. When the bits of the RA preamble index are all non-zeroes, the SSB indicator indicates an SSB used to determine an RACH occasion for PRACH transmission. Otherwise, it is reserved.
PRACH mask index: 4 bits. When the bits of the RA preamble index are all non-zeroes, the PRACH mask index indicates an RACH occasion associated with the SSB indicated by the SSB index. Otherwise, it is reserved.
Reserved: 10 bits When DCI format 1_0 does not correspond to a PDCCH order, DCI format 1_0 includes fields used to schedule a PDSCH (e.g., a time domain resource assignment, a modulation and coding scheme (MCS), an HARQ process number, a PDSCH-to-HARQ feedback timing indicator, and so on).

2-Step Random Access Procedure

In the prior art, random access is performed by a 4-step procedure as described above. In the legacy LTE system, an average of 15.5 ms is required for the 4-step random access procedure.

TABLE 5

| Component | Description | Time (ms) |
|---|---|---|
| 1 | Average delay due to RACK scheduling period (1 ms RACK cycle) | 0.5 |
| 2 | RACK Preamble | 1 |
| 3-4 | Preamble detection and transmission of RA response (Time between the end RACH transmission and UE's reception of scheduling grant and timing adjustment) | 3 |
| 5 | UE Processing Delay (decoding of scheduling grant, timing alignment and C-RNTI assignment + L1 encoding of RRC Connection Request) | 5 |
| 6 | Transmission of RRC and NAS Reguest | 1 |
| 7 | Processing delay in eNB (L2 and RRC) | 4 |
| 8 | Transmission of RRC Connection Set-up (and UL grant) | 1 |

The NR system may require lower latency than conventional systems. When random access occurs in a U-band, the random access may be terminated, that is, contention may be resolved only if the UE and BS sequentially succeed in LBT in all steps of the 4-step random access procedure. If the LBT fails even in one step of the 4-step random access procedure, resource efficiency may decrease, and latency may increase. If the LBT fails in a scheduling/transmission process associated with Msg2 or Msg3, the resource efficiency may significantly decrease, and the latency may significantly increase. For random access in an L-band, low latency may be required in various scenarios of the NR system. Therefore, a 2-step random access procedure may be performed in the L-band as well.

To reduce latency in a random access procedure, the 2-step random access procedure may be used in the present disclosure.

As illustrated in FIG. 9(a), the 2-step random access procedure may include two steps: transmission of a UL signal (referred to as MsgA) from the UE to the BS and transmission of a DL signal (referred to as MsgB) from the BS to the UE.

The following description focuses on the initial access procedure, but the proposed methods may be equally applied to the random access procedure after the UE and BS establish an RRC connection. Further, a random access preamble and a PUSCH part may be transmitted together in a non-contention random access procedure as shown in FIG. 9(b).

While not shown, the BS may transmit a PDCCH for scheduling MsgB to the UE, which may be referred to as an MsgB PDCCH.

3. Physical Random Access Channel (PRACH) Transmission in U-Band

The Wi-Fi standard (802.11ac) specifies a CCA threshold of −62 dBm for non-Wi-Fi signals and a CCA threshold of −82 dBm for Wi-Fi signals. In other words, if a station (STA) or access point (AP) of the Wi-Fi system transmits no signal in a specific band if the STA or AP receives a signal from a device not included in the Wi-Fi system in the specific band at a power of −62 dBm or higher.

PRACH formats may include a long RACH format and a short RACH format. A PRACH with the long RACH format is configured with a length-839 sequence. A PRACH with the short RACH format is configured with a length-139 sequence. Hereinafter, the sequence structure of the short RACH format will be described. For frequency range 1 (FR1) below 6 GHz, the SCS of the short RACH format may be 15 and/or 30 KHz. The PRACH with the short RACH format may be transmitted in 12 RBs as shown in FIG. 10. The 12 RBs include 144 REs, and the PRACH may be transmitted over 139 tones (139 REs) of 144 REs. FIG. 10 shows that among 144 REs, two REs with the lowest indices and three REs with the highest indices are null tones, but the positions of the null tones may be different from those shown in FIG. 10.

When a specific device (and/or node) transmits a signal in a U-band, there may be restrictions in terms of power spectral density (PSD). For example, according to the ETSI regulation, signal transmission in a specific band needs to satisfy a PSD of 10 dBm/1 MHz. If a PRACH is transmitted based on the structure shown in FIG. 10 in the 15 kHz SCS, the maximum allowable power for the PRACH may be about 14 dBm by considering that the bandwidth is about 2.1 MHz. In general, the maximum power of the UE is 23 dBm, and the maximum allowable power of 14 dBm is significantly lower than 23 dBm. If the UE transmits a UL signal at 14 dBm, the maximum UL coverage supported by the UE may be reduced. If the UE transmits the PRACH in a wide frequency domain (F-domain) rather than 14 consecutive RBs to increase the transmit power, it may help to solve the problem that the UL coverage becomes small. As regulations in U-bands, there may be restrictions in terms of occupied channel bandwidth (OCB). For example, when a specific device transmits a signal, the signal may need to occupy at least 80% of the system bandwidth. If the system bandwidth is 20 MHz, the signal transmitted by the specific device may need to occupy more than 16 MHz, which is 80% of 20 MHz.

Hereinafter, the structure of a PRACH preamble in consideration of the PSD and OCB regulations will be described. Specifically, the present disclosure proposes a method of allocating and/or mapping resources for the PRACH preamble in the frequency domain. The method of allocating and/or mapping the resources for the PRACH preamble in the frequency domain may refer to a RACH allocation/mapping method in the frequency domain. The methods proposed in the present disclosure may be applied to other use cases besides the NR U-band in consideration of the PSD and OCB regulations. For example, the PRACH structure proposed in the present disclosure may be used for an NR-based non-terrestrial network (NTN).

Interlaced PRACH with Single PRB Based

As described above, the PRACH with the short RACH format may be configured with the length-139 sequence. The length of a short Zadoff-Chu (ZC) sequence is 139. Hereinafter, a method of transmitting a length-139 PRACH sequence in the form of an interlaced PRACH will be described.

In an NR U-band, if a plurality of consecutive REs in the frequency domain are defined as an RE group (e.g., 6 REs or 12 REs=1 RB), a set of a plurality of non-consecutive RE groups in the frequency domain may be defined as a resource unit for transmitting one signal and/or channel in consideration of the OCB and PSD-related regulations. The plurality of non-consecutive RE groups may be located at the same interval in the frequency domain or may be located at irregular intervals. As the resource unit for transmitting one signal and/or channel, the set of RE groups may be defined as an REG-interlace. The REG-interlace may be referred to as an RB-interlace. In the NR U-band, one signal and/or channel transmission resource may be configured, for example, as shown in FIG. 11. FIG. 11 illustrates that a resource unit for transmitting one signal and/or channel is configured with and/or consists of a single REG-interlace. That is, one signal and/or channel may be transmitted in one RB-interlace of FIG. 11.

Considering the OCB, the bandwidth occupancy of a specific signal and/or channel may be determined only by the interval between the frequency resource with the lowest index and the frequency resource with the highest index among frequency resources occupied by the specific signal and/or channel. For example, even if there is a resource that is not actually used for transmission of a specific channel between the frequency resource with the lowest index and the frequency resource with the highest index occupied by the corresponding channel as in the RB-interlace, it is determined that a device transmitting the corresponding channel occupies all frequency resources from the frequency resource with the lowest index to the frequency resource with the highest index.

One PRACH may be transmitted through one RB-interlace as shown in FIG. 11. Hereinafter, specific structures in which the PRACH is transmitted through the RB-interlace will be proposed.

FIGS. 12 and 13 illustrate examples in which RB #n, RB #n+k, . . . , RB #n+11k are set to an RB-interlace. In FIGS. 12 and 13, the length-139 PRACH sequence may be mapped to 12 RBs. Since only 139 REs among 144 REs are used, zero padding needs to be performed 5 times.

In this document, (i) an RB in which the PRACH sequence is mapped to 11 REs and zero padding is performed on one RE is defined as an $RB_{P\_1}$, and (ii) an RB in which the PRACH sequence is mapped to all 12 REs is defined as an $RB_{P\_0}$. Referring to FIG. 12, resources to which the PRACH sequence is mapped include 5 $RBs_{P\_1}$ and 7 $RBs_{P\_0}$.

FIG. 12(a) shows an example in which 5 $RBs_{P\_1}$ are arranged in the center of the RB-interlace in the frequency domain in consideration of the OCB. For example, the $RB_{P\_1}$ may be located at the 4th to 8th RBs (RB #n+3k to RB #n+7k) or the 5th to 9th RBs (RB #n+4k to RB #n+8k) among the 12 RBs included in the RB-interlace in ascending order of indices. Alternatively, the $RB_{P\_1}$ may be located at the 2nd, 4th, 6th, 8th, and 10th RBs (RB #n+k, RB #n+3k, RB #n+5k, RB #n+7k, and RB #n+9k) among the 12 RBs included in the RB-interlace in ascending order of indices in the frequency domain. The $RB_{P\_0}$ may be located at RBs where there is no $RB_{P\_1}$ among the 12 RBs included in the RB-interlace. Although FIG. 12(a) shows that zero padding is performed on the RE with the lowest index among REs of the $RB_{P\_1}$, the location of the RE where zero padding is performed in the RB may be changed.

FIG. 12(b) shows an interlaced PRACH having a different structure from FIG. 12(a). When there are 5 $RBs_{P\_1}$ where zero padding is performed on the RE with the lowest index, the 5 $RBs_{P\_1}$ may be arranged such that zero padding is not performed on the RE with the lowest index among the 144 REs in consideration of the OCB. For example, referring to FIG. 12(b), the 5 $RBs_{P\_1}$ may be located at RBs with the highest indices (RB #n+7k to RB #n+11k), and the $RBs_{P\_0}$ may be located at the remaining RBs. If no $RB_{P\_1}$ is located at RB #n, the locations of the $RBs_{P\_1}$ may be changed.

FIG. 12(c) shows an interlaced PRACH having a different structure from FIGS. 12(a) and 12(b). When there are 5 $RBs_{P\_1}$ where zero padding is performed on the RE with the highest index, the 5 $RBs_{P\_1}$ may be arranged such that zero padding is not performed on the RE with the highest index among the 144 REs in consideration of the OCB. For example, referring to FIG. 12(c), the 5 $RBs_{P\_1}$ may be located at RBs with the lowest indices (RB #n to RB #n+4k), and the $RBs_{P\_0}$ may be located at the remaining RBs. If no $RB_{P\_1}$ is located at RB #n+11k, the locations of the $RBs_{P\_1}$ may be changed.

In this document, (iii) an RB in which the PRACH sequence is mapped to 7 REs and zero padding is performed on 5 REs is defined as an $RB_{P\_5}$. In FIG. 13, resources to which the PRACH sequence is mapped include one $RB_{P\_5}$ and 11 $RBs_{P\_0}$.

FIG. 13(a) shows an example in which one $RB_{P\_5}$ is arranged at the center of the RB-interlace in the frequency domain in consideration of the OCB. For example, the $RB_{P\_5}$ may be located at the 6th RB (RB #n+5k) or the 7th RB (RB #n+6k) among the 12 RBs included in the RB-interlace in ascending order of indices. The $RB_{P\_0}$ may be located at RBs where there is no $RB_{P\_5}$ among the 12 RBs included in the RB-interlace. Although FIG. 13(a) shows that zero padding is performed on the 5 REs with the highest indices among REs of the $RB_{P\_5}$, the locations of the REs where zero padding is performed in the RB may be changed.

FIG. 13(b) shows an interlaced PRACH having a different structure from FIG. 13(a). When there is one $RB_{P\_5}$ where zero padding is performed on REs with the lowest indices, the $RB_{P\_5}$ may be arranged such that zero padding is not performed on the RE with the lowest index among the 144 REs in consideration of the OCB. For example, referring to FIG. 13(b), 5 $RBs_{P\_5}$ may be located at the RB with the highest index (RB #n+11k), and the $RBs_{P\_0}$ may be located at the remaining RBs. Unless the $RB_{P\_5}$ is located at RB #n, the location of the $RB_{P\_5}$ may be changed.

FIG. 13(c) shows an interlaced PRACH having a different structure from FIGS. 13(a) and 13(b). When there are 5 $RBs_{P\_1}$ where zero padding is performed on the RE with the highest index, the 5 $RBs_{P\_1}$ may be arranged such that zero padding is not performed on the RE with the highest index among the 144 REs in consideration of the OCB. For example, referring to FIG. 12(c), the 5 $RBs_{P\_1}$ may be located at the RBs with the lowest indices (RB #n), and the $RBs_{P\_0}$ may be located at the remaining RBs. Unless the $RB_{P\_5}$ is located at RB #n+11k, the locations of the $RB_{P\_5}$ may be changed.

Interlaced PRACH with 6 PRB Based

FIGS. 14 to 15 illustrate examples of an interlaced PRACH where a length-139 PRACH sequence is configured based on 6 PRBs. In this document, RB_max may denote the maximum number of RBs and/or indices in an initial UL transmission frequency band of the UE during the initial access procedure. The initial UL transmission frequency band of the UE may be, for example, an initial UL BWP and/or an initial UL component carrier (CC). In the legacy NR Rel-15 specification, the value of RB_max is defined as 106 for the 15 kHz SCS, 30 for the 30 kHz SCS, and 24 for the 60 kHz SCS. However, in consideration of the operation characteristics of the NR U-band, the RB_max value may be reduced by R (R is a natural number greater than or equal to 1). As an example of the operating characteristics of the NR U-band, guard band insertion in the NR U-band may be considered. In the following interlaced PRACH, the interlaced PRACH may be configured based on the value of RB_max reduced by R. If the transmission bandwidth (BW) of the initial UL BWP is N times larger than 20 MHz, the number of RACH occasions (ROs), which will be described below, may increase N times. For example, if the transmission BW is 40 MHz, the number of ROs may be doubled, and if the transmission BW is 80 MHz, the number of ROs may increase four times.

Since 12 PRBs are required for a length-139 sequence, one sequence may be divided into two sub-sequences to configure the length-139 sequence based on 6 PRBs. In this document, it is defined in consideration of the OCB based on 20 MHz that frequency-domain mapping is performed one, two, and three times for the 60, 30, and 15 kHz SCSs, respectively. In other words, in consideration of the OCB based on 20 MHz, one, two, and three ROs are defined for the 60, 30, and 15 kHz SCSs, respectively.

FIG. 14(a) shows an example in which three ROs are defined for the 15 kHz SCS. Referring to FIG. 14(a), RO#1 includes (i) a first subsequence mapped to 6 consecutive RBs from RB index 0 and (ii) a second subsequence mapped to 6 consecutive RBs from RB index {(RB_max−1)−18+1}. RO#2 includes (i) a first subsequence mapped to 6 consecutive RBs from RB index 6 and (ii) a second subsequence mapped to 6 consecutive RBs from RB index {(RB_max−1)−12 +1}. RO#3 includes (i) a first subsequence mapped to 6 consecutive RBs from RB index 12 and (ii) a second subsequence mapped to 6 consecutive RBs from RB index {(RB_max−1)−6+1}. In this document, the expression of consecutive b RBs from RB index a may mean an RB corresponding to RB index a, an RB corresponding to RB index a+b−1, and all RBs positioned between the two RBs.

FIG. 14(b) shows an example in which two ROs are defined for the 30 kHz SCS. Referring to FIG. 14(b), RO #1 includes (i) a first subsequence mapped to 6 consecutive RBs from RB index 0 and (ii) a second subsequence mapped to 6 consecutive RBs from RB index {(RB_max−1)−12+1}. RO #2 includes (i) a first subsequence mapped to 6 consecutive RBs from RB index 6 and (ii) a second subsequence mapped to 6 consecutive RBs from RB index {(RB_max−1)−6+1}.

FIG. 14(c) shows an example in which one RO is defined for the 60 kHz SCS. Referring to FIG. 14(c), RO #1 includes (i) a first subsequence mapped to 6 consecutive RBs from RB index 0 and (ii) a second subsequence mapped to 6 consecutive RBs from RB index {(RB_max−1)−6+1}.

For all of the ROs of FIG. 14, a single PRACH sequence may be divided into two subsequences that constitute one RO and are mapped to 12 RBs. The two subsequences are different sequences. In addition, by concatenating the two subsequences are concatenated, the single PRACH sequence is formed.

In the interlaced PRACH configured based on 6 PRBs, the RE structure of RBs may be the same as that shown in FIG. 15. When the length-139 PRACH sequence is mapped to 12 RBs based on 6 PRBs, zero padding is performed on 5 REs among 144 REs.

In this document, (i) an RB in which the PRACH sequence is mapped to 9 REs and zero padding is performed on three REs is defined as an $RB_{P\_3}$, and (ii) an RB in which the PRACH sequence is mapped to 10 REs and zero padding is performed on two REs is defined as an $RB_{P\_2}$. As described above, (iii) an RB in which the PRACH sequence is mapped to 12 REs is defined as the $RB_{P\_0}$. The length-139 PRACH sequence is mapped to one $RB_{P\_3}$, one $RB_{P\_2}$, and 10 $RBs_{P\_0}$.

FIG. 15($a$) shows an example in which the length-139 PRACH sequence is mapped to one $RB_{P\_3}$, one $RB_{P\_2}$, and 10 $RBs_{P\_0}$. Referring to FIG. 15($a$), 5 $RBs_{P\_0}$ and one $RB_{P\_2}$ are consecutively located, and 5 $RBs_{P\_0}$ and one $RB_{P\_3}$ are consecutively located in order to configure the PRACH sequence based on 6 PRBs. In consideration of the OCB, the $RB_{P\_3}$ and $RB_{P\_2}$ may be located at center RBs among RBs included in an RB-interlace. For example, when the RBs included in the RB-interlace are RB #0, RB #1, RB #2, RB #3, RB #4, RB #5, RB #45, RB #46, RB #47, RB #48, RB #49, and RB #50, one of the $RB_{P\_3}$ and $RB_{P\_2}$ including zero-padded REs may be located at RB #5, and the other may be located at RB #45. Among the RBs included in the RB-interlace, the 6 PRBs with low indices (e.g., RB #0, RB #1, RB #2, RB #3, RB #4, and RB #5) may be referred to as a first 6-RB cluster, and the 6 PRBs with high indices (e.g., RB #45, RB #46, RB #47, RB #48, RB #49, and RB #50) may be referred to as a second 6-RB cluster.

In one of the $RB_{P\_3}$ and $RB_{P\_2}$, zero padding may be performed on REs with the lowest indices. The RB where zero padding is performed on the REs with the lowest indices may be arranged to have the lowest RB index (e.g., RB #45 among RB #45, RB #46, RB #47, RB #48, RB #49, and RB #50) among the 6 RBs included in the second 6-RB cluster.

In the other one of the $RB_{P\_3}$ and $RB_{P\_2}$, zero padding may be performed on REs with the highest indices. The RB where zero padding is performed on the REs with the highest indices may be arranged to have the highest RB index (e.g., RB #5 among RB #0, RB #1, RB #2, RB #3, RB #4, and RB #5) among the 6 RBs included in the first 6-RB cluster.

FIG. 15($a$) shows an example in which the $RB_{P\_2}$ is arranged to have the highest RB index among the 6 RBs included in the first 6-RB cluster and the RB P_3 is arranged to have the lowest RB index among the 6 RBs included in the second 6-RB cluster. However, unlike FIG. 15, the RB P_3 may be arranged to have the highest RB index among the 6 RBs included in the first 6-RB cluster, and the RB P_2 may be arranged to have the lowest RB index among the 6 RBs included in the second 6-RB cluster.

In this document, (i) an RB in which the PRACH sequence is mapped to 8 REs and zero padding is performed on four REs is defined as an $RB_{P\_4}$. As described above, (ii) an RB in which the PRACH sequence is mapped to 10 REs and zero padding is performed on two REs is defined as the $RB_{P\_2}$, and (iii) an RB in which the PRACH sequence is mapped to 12 REs is defined as the $RB_{P\_0}$.

FIG. 15($b$) shows an example in which the $RB_{P\_1}$ is arranged to have the highest RB index among the 6 RBs included in the first 6-RB cluster and the $RB_{P\_4}$ is arranged to have the lowest RB index among the 6 RBs included in the second 6-RB cluster. However, unlike FIG. 15, the $RB_{P\_4}$ may be arranged to have the highest RB index among the 6 RBs included in the first 6-RB cluster, and the $RB_{P\_1}$ may be arranged to have the lowest RB index among the 6 RBs included in the second 6-RB cluster.

In this document, (i) an RB in which the PRACH sequence is mapped to 7 REs and zero padding is performed on 5 REs is defined as an $RB_{P\_5}$. As described above, (ii) an RB in which the PRACH sequence is mapped to 12 REs is defined as the $RB_{P\_0}$.

FIGS. 15($c$) and 15($d$) show examples in which the length-139 PRACH sequence is mapped to one $RB_{P\_5}$ and 11 $RB_{P\_0}$. Referring to FIGS. 15($c$) and 15($d$), 5 $RBs_{P\_0}$ and one $RB_{P\_5}$ are consecutively located, and 6 $RBs_{P\_0}$ are consecutively located in order to configure the PRACH sequence based on 6 PRBs. In consideration of the OCB, the $RB_{P\_5}$ may be located at center RBs among the RBs included in the RB-interlace. For example, when the RBs included in the RB-interlace are the following 12 RBs: RB #0, RB #1, RB #2, RB #3, RB #4, RB #5, RB #45, RB #46, RB #47, RB #48, RB #49, and RB #50, the $RB_{P\_5}$ including the zero-padded REs may be located at RB #5 or RB #45.

Zero padding may be performed on REs with the lowest indices among REs of the $RB_{P\_5}$. The RB where zero padding is performed on the REs with the lowest indices may be arranged to have the lowest RB index (e.g., RB #45 among RB #45, RB #46, RB #47, RB #48, RB #49, and RB #50) among the 6 RBs included in the second 6-RB cluster. FIG. 15($c$) shows an example in which the $RB_{P\_5}$ is arranged to have the lowest RB index among the 6 RBs included in the second 6-RB cluster.

Zero padding may be performed on REs with the highest indices among the REs of the $RB_{P\_5}$. The RB where zero padding is performed on the REs with the highest indices may be arranged to have the highest RB index (e.g., RB #5 among RB #0, RB #1, RB #2, RB #3, RB #4, and RB #5) among the 6 RBs included in the first 6-RB cluster. FIG. 15($d$) shows an example in which the $RB_{P\_5}$ is arranged to have the highest RB index among the 6 RBs included in the second 6-RB cluster.

Concatenated PRACH

FIGS. 16 to 17 show examples of a concatenated PRACH, which is obtained by configuring a length-139 PRACH sequence based on 12 PRBs and repeatedly mapping the length-139 PRACH sequence in the frequency domain in consideration of the OCB. As described above, RB_max may denote the maximum number of RBs and/or indices in an initial UL transmission frequency band of the UE during the initial access procedure. The initial UL transmission frequency band of the UE may be, for example, an initial UL BWP and/or an initial UL CC. In the legacy NR Rel-15 specification, the value of RB_max is defined as 106 for the 15 kHz SCS, 30 for the 30 kHz SCS, and 24 for the 60 kHz SCS. However, in consideration of the operation characteristics of the NR U-band, the RB_max value may be reduced by R (R is a natural number greater than or equal to 1). As an example of the operating characteristics of the NR U-band, guard band insertion in the NR U-band may be considered. In the following concatenated PRACH, the concatenated PRACH may be configured based on the value of RB_max reduced by R. If the transmission BW of the initial UL BWP is N times larger than 20 MHz, the number of ROs may increase N times. For example, if the transmission BW is 40 MHz, the number of ROs may be doubled, and if the transmission BW is 80 MHz, the number of ROs may increase four times.

FIG. 16(a) shows an example in which two ROs are defined for the 15 kHz SCS. Referring to FIG. 16(a), RO #1 includes (i) a first sequence mapped to 12 consecutive RBs from RB index 0 and (ii) a second sequence mapped to 12 consecutive RBs from RB index {(RB_max−1)−24+1}. RO #2 includes (i) a first sequence mapped to 12 consecutive RBs from RB index 12 and (ii) a second sequence mapped to 12 consecutive RBs from RB index {(RB_max−1)−12+1}.

For the 15 kHz SCS, the BW occupied by one RO is 1500×12×(106−12)=16920 kHz when RB_max is 106 RBs. That is, the number of RBs allocated to 20 MHz is 106. Since the BW occupied by one RO is greater than 16 MHz, the OCB requirement is satisfied.

FIG. 16(b) shows an example in which one RO is defined for the 30 kHz SCS. Referring to FIG. 16(b), RO #1 includes (i) a first sequence mapped to 12 consecutive RBs from RB index 0 and (ii) a second sequence mapped to 12 consecutive RBs from RB index {(RB_max−1)−12+1}.

For all of the ROs of FIG. 16, two sequences included in one RO may be configured by repeating one PRACH sequence twice. Accordingly, the two sequences may be the same sequence.

Alternatively, two sequences mapped to 24 RBs included in one RO may be two different PRACH sequences. If the two sequences are different from each other, there is an advantage that a total of 64×64=4096 PRACH preambles may be used for one RO. When the two sequences are the same, 64 PRACH preambles may be used.

For example, it may be configured for the UE that a root index of R is used for a sequence to be located at a low frequency part of the concatenated PRACH and a root index of 137−R is used for a sequence to be located at a high frequency part of the concatenated PRACH. If the BS performs PRACH detection on the assumption that the root index of 137−R is used for the sequence to be located at the low frequency part and the root index of R is used for the sequence to be located at the high frequency part, the BS may detect no PRACH sequences from the UE.

Additionally, two sequences mapped to 24 RBs included in one RO may be identical to each other, but opposite RE mapping may be applied to the two sequences. In addition, when the two sequences are the same, different RE mapping may be applied to the starting positions of the two sequences based on cyclic shifts (CSs).

In the concatenated PRACH configured based on 12 PRBs, the RE structure of RBs may be the same as that shown in FIG. 17. When the length-139 PRACH sequence is mapped to 24 RBs based on 12 PRBs, zero padding is performed on 5 REs among 144 REs for every 12 RBs. 12 PRBs with low indices may be referred to as a first 12-RB cluster, and 12 PRBs with high indices may be referred to as a second 12-RB cluster.

FIG. 17(a) shows an example in which a frequency mapping method for a PRACH sequence used in the legacy NR system is repeatedly applied to 24 RBs. The legacy NR system may mean the NR Rel-15 system or systems before NR Rel-15. In the legacy NR system, zero padding is performed on two REs with the lowest indices or three REs with the highest indices among 144 REs. Referring to FIG. 17(a), the frequency mapping method of the legacy NR system may be equally applied to two PRACH sequences. According to the frequency mapping method of FIG. 17(a), the UE implementation complexity may decrease, and thus it is advantageous in terms of RO sharing, which will be described later.

FIG. 17(b) shows an example in which the frequency mapping method for the PRACH sequence used in the legacy NR system is applied to only one PRACH sequence to be transmitted in one frequency band of the two 12-RB clusters. The frequency mapping method for the PRACH sequence used in the legacy NR system may be modified and applied to another PRACH sequence to be transmitted in the remaining one frequency band.

Referring to FIG. 17(b), the frequency mapping method for the conventional PRACH sequence is applied to the first PRACH sequence to be transmitted in the first 12-RB cluster. That is, zero padding is performed on two REs with the lowest indices and three REs with the highest indices. The frequency mapping method for the conventional PRACH sequence is modified and applied to the second PRACH sequence to be transmitted in the second 12-RB cluster. That is, zero padding is performed on three REs with the lowest indices and two REs with the highest indices.

Unlike FIG. 17(b), the frequency mapping method for the conventional PRACH sequence may be modified and applied to the first PRACH sequence to be transmitted in the first 12-RB cluster. That is, zero padding may be performed on three REs with the lowest indices and two REs with the highest indices. In addition, the frequency mapping method for the conventional PRACH sequence is applied to the second PRACH sequence to be transmitted in the second 12-RB cluster. That is, zero padding is performed on two REs with the lowest indices and three REs with the highest indices.

FIG. 17(c) shows an example in which zero padding is performed on 5 REs corresponding to the highest or lowest indices, independently of the frequency mapping method for the PRACH sequence used in the legacy NR system. Referring to FIG. 17(c), zero padding is performed on 5 REs with to the highest indices in the first PRACH sequence to be transmitted in the first 12-RB cluster, and zero padding is performed on 5 REs with to the lowest indices in the second PRACH sequence to be transmitted in the second 12-RB cluster. According to the frequency mapping method of FIG. 17(c), since the BW occupied by one RO is widened, there is a gain in terms of the OCB.

L-Times Concatenated PRACH (L>=2)

As described above, a concatenated PRACH may be configured by mapping a length-139 PRACH sequence to 12 consecutive PRBs in the frequency domain. The concatenated PRACH may be mapped and/or configured L times in the frequency domain in consideration of the OCB. In other words, the concatenated PRACH may be repeated the maximum number of times (L>=2) while maintaining the maximum number of ROs configurable within a UL transmission frequency band. For example, when the transmission BW of a UL BWP is 20 MHz, the concatenated PRACH may be repeated up to four times while maintaining the defined number of ROs as described in the section of concatenated PRACH. If the concatenated PRACH is repeated, there may be a gain in terms of the PSD, compared to when the concatenated PRACH is not repeated. As described above, RB_max may denote the maximum number of RBs and/or indices in an initial UL transmission frequency band of the UE during the initial access procedure. The initial UL transmission frequency band of the UE may be, for example, an initial UL BWP and/or an initial UL CC. If the transmission BW of the initial UL BWP is N times larger than 20 MHz, the number of ROs may increase N times. For example, if the transmission BW is 40 MHz, the number of ROs may be doubled, and if the transmission BW is 80 MHz, the number of ROs may increase four times.

FIGS. 18 and 19 show examples in which a concatenated PRACH is repeated. In FIGS. 18 and 19, a single sequence is repeated four times. It is defined that frequency-domain mapping is performed one and two times for the 30 and 15 kHz SCSs, respectively. In other words, one and two ROs are defined for the 30 and 15 kHz SCSs, respectively.

FIG. 18(a) shows an example in which two ROs are defined for the 15 kHz SCS. Referring to FIG. 18(a), RO #1 includes (i) a first sequence mapped to 12 consecutive RBs from RB index 1, (ii) a second sequence mapped to 12 consecutive RBs from RB index {(RB_max−3)−77+1}, (iii) a third sequence mapped to 12 consecutive RBs from RB index {(RB_max−3)−51+1}, and (iv) a fourth sequence mapped to 12 consecutive RBs from RB index {(RB_max−3)−25+1}. RO #2 includes (i) a first sequence mapped to 12 consecutive RBs from RB index 14, (ii) a second sequence mapped to 12 consecutive RBs from RB index {(RB_max−3)−64+1}, (iii) a third sequence mapped to 12 consecutive RBs from RB index {(RB_max−3)−38+1}, and (iv) a fourth sequence mapped to 12 consecutive RBs from RB index {(RB_max−3)−12+1}. When RB_max is 106 RBs, each sequence mapped to 12 RBs has the same interval of one RB. For each sequence mapped to 12 RBs, a null value is allocated to three RBs located at the edge in the frequency domain. For example, the null value is allocated to RBs with the following indices: RB #0, RB #max−1, and RB #max−2.

FIG. 18(b) shows another example in which two ROs are defined for the 15 kHz SCS. Referring to FIG. 18(b), RO #1 includes (i) a first sequence mapped to 12 consecutive RBs from RB index 2, (ii) a second sequence mapped to 12 consecutive RBs from RB index {(RB_max−2)−77+1}, (iii) a third sequence mapped to 12 consecutive RBs from RB index {(RB_max−2)−51+1}, and (iv) a fourth sequence mapped to 12 consecutive RBs from RB index {(RB_max−2)−25+1}. RO #2 includes (i) a first sequence mapped to 12 consecutive RBs from RB index 15, (ii) a second sequence mapped to 12 consecutive RBs from RB index {(RB_max−2)−64+1}, (iii) a third sequence mapped to 12 consecutive RBs from RB index {(RB_max−2)−38+1}, and (iv) a fourth sequence mapped to 12 consecutive RBs from RB index {(RB_max−2)−12+1}. When RB_max is 106 RBs, each sequence mapped to 12 RBs has the same interval of one RB. For each sequence mapped to 12 RBs, a null value is allocated to three RBs located at the edge in the frequency domain. For example, the null value is allocated to RBs with the following indices: RB #0, RB #1, and RB #max−1.

FIG. 18(c) shows a further example in which two ROs are defined for the 15 kHz SCS. Referring to FIG. 18(c), RO #1 includes (i) a first sequence mapped to 12 consecutive RBs from RB index 1, (ii) a second sequence mapped to 12 consecutive RBs from RB index {(RB_max−2)−77+1}, (iii) a third sequence mapped to 12 consecutive RBs from RB index {(RB_max−2)−51+1}, and (iv) a fourth sequence mapped to 12 consecutive RBs from RB index {(RB_max−2)−25+1}. RO #2 includes (i) a first sequence mapped to 12 consecutive RBs from RB index 14, (ii) a second sequence mapped to 12 consecutive RBs from RB index {(RB_max−2)−64+1}, (iii) a third sequence mapped to 12 consecutive RBs from RB index {(RB_max−2)−38+1}, and (iv) a fourth sequence mapped to 12 consecutive RBs from RB index {(RB_max−2)−12+1}. When RB_max is 106 RBs, each sequence mapped to 12 RBs has the same interval of one RB. For each sequence mapped to 12 RBs, a null value is allocated to two RBs located at the edge in the frequency domain. For example, the null value is allocated to RBs with the following indices: RB #0 and RB #max−1.

For all examples in which two ROs are defined for the 15 kHz SCS, RO #1 includes (i) a first sequence mapped to 12 consecutive RBs from RB index a, (ii) a second sequence mapped to 12 consecutive RBs from RB index a+26, (iii) a third sequence mapped to 12 consecutive RBs from RB index a+26×2, and (iv) a fourth sequence mapped to 12 consecutive RBs from RB index a+26×3, and RO #2 includes (i) a first sequence mapped to 12 consecutive RBs from RB index a+13, (ii) a second sequence mapped to 12 consecutive RBs from RB index a+13+26, (iii) a third sequence mapped to 12 consecutive RBs from RB index a+13+26×2, and (iv) a fourth sequence mapped to 12 consecutive RBs from RB index a+13+26×3, where a is one of 0, 1, 2, and 3.

FIG. 19(a) shows an example in which one RO is defined for the 30 kHz SCS. Referring to FIG. 19(a), RO #1 includes (i) a first sequence mapped to 12 consecutive RBs from RB index 0, (ii) a second sequence mapped to 12 consecutive RBs from RB index {(RB_max−1)−38+1}, (iii) a third sequence mapped to 12 consecutive RBs from RB index {(RB_max−1)−25+1}, and (iv) a fourth sequence mapped to 12 consecutive RBs from RB index {(RB_max−1)−12+1}. When RB_max is 51 RBs, each sequence mapped to 12 RBs has the same interval of one RB.

FIG. 19(b) shows another example in which one RO is defined for the 30 kHz SCS. Referring to FIG. 19(b), RO #1 includes (i) a first sequence mapped to 12 consecutive RBs from RB index 0, (ii) a second sequence mapped to 12 consecutive RBs from RB index {(RB_max−1)−37+1}, (iii) a third sequence mapped to 12 consecutive RBs from RB index {(RB_max−1)−25+1}, and (iv) a fourth sequence mapped to 12 consecutive RBs from RB index {(RB_max−1)−12+1}. When RB_max is 50 RBs, each sequence mapped to 12 RBs has the following interval: 1 RB, 0 RBs, and 1 RB in ascending order of frequency indices.

FIG. 19(c) shows a further example in which one RO is defined for the 30 kHz SCS. Referring to FIG. 19(c), RO #1 includes (i) a first sequence mapped to 12 consecutive RBs from RB index 0, (ii) a second sequence mapped to 12 consecutive RBs from RB index {(RB_max−1)−38+1}, (iii) a third sequence mapped to 12 consecutive RBs from RB index {(RB_max−1)−24+1}, and (iv) a fourth sequence mapped to 12 consecutive RBs from RB index {(RB_max−1)−12+1}. When RB_max is 50 RBs, each sequence mapped to 12 RBs has the following interval: 0 RBs, 2 RBs, and 0 RBs in ascending order of frequency indices.

For all examples in which one RO is defined for the 30 kHz SCS, RO #1 includes (i) a first sequence mapped to 12 consecutive RBs from RB index a, (ii) a second sequence mapped to 12 consecutive RBs from RB index a+13, (iii) a third sequence mapped to 12 consecutive RBs from RB index a+13×2, and (iv) a fourth sequence mapped to 12 consecutive RBs from RB index a+13×3. Alternatively, RO #1 includes (i) a first sequence mapped to 12 consecutive RBs from RB index a, (ii) a second sequence mapped to 12 consecutive RBs from RB index a+12, (iii) a third sequence mapped to 12 consecutive RBs from RB index a+12×2, and (iv) a fourth sequence mapped to 12 consecutive RBs from RB index a+12×3. Alternatively, RO #1 includes (i) a first sequence mapped to 12 consecutive RBs from RB index a, (ii) a second sequence mapped to 12 consecutive RBs from RB index a+12+b, (iii) a third sequence mapped to 12 consecutive RBs from RB index a+12×2+b, and (iv) a fourth sequence mapped to 12 consecutive RBs from RB index a+12×3+b×2. Here, a may be 0, 1, 2 and/or 3, and b may be 0, 1, 2 and/or 3.

As shown in FIGS. 18 and 19, when four different length-139 PRACH sequences are mapped to 48 RBs, zero padding is performed on 5 REs for every 12 RBs. The structures shown in FIG. 17 and/or combinations thereof may be applied when four PRACH sequences are mapped to one RO. For example, the method of FIG. 17(*a*) may be applied to all the four PRACH sequences. In another example, the method of FIG. 17(*a*) may be applied to two of the four PRACH sequences, and the method of FIG. 17(*b*) may be applied to the remaining two PRACH sequences.

As a more specific example, when four PRACH sequences are mapped to one RO, the four PRACH sequences may be indexed in ascending order of frequency so that PRACH sequence #1, PRACH sequence #2, PRACH sequence #3, PRACH sequence #4 may be defined. Whether the OCB requirement is satisfied is determined based on 5 times of zero padding (total 10 times of zero padding) performed on PRACH sequences #1 and #4. Considering the OCB requirement, one of the methods proposed in FIG. 17 may be applied to PRACH sequences #1 and #4, and the same method may be applied to PRACH sequences #2 and #3.

In the legacy NR system, in a BW of 20 MHz, up to 8 frequency-domain ROs may be configured for the 15 kHz SCS, and up to four frequency-domain ROs may be configured for the 30 kHz SCS. According to the L-times concatenated PRACH method described above, in one LBT-subband (LBT-SB), up to two frequency-domain ROs may be configured for the 15 kHz SCS, and one frequency-domain RO may be configured for the 30 kHz SCS in consideration of the OCB requirement.

To support the same frequency-domain RO capacity as the legacy NR system, the BS may increase the number of PRACH LBT-SBs that may be (initially) configured for the UE to K. For example, if the number of PRACH LBT-SBs is set to K, the BW may be 20K MHz. In the K PRACH LBT-SBs, 2K frequency-domain ROs may be configured for the 15 kHz SCS, and K ROs may be configured for the 30 kHz SCS. K may be set to a positive integer more than or equal to 1 and less than or equal to K_max. Preferably, K_max may be defined by K_max=4 for the same frequency-domain RO capacity as the legacy NR system.

The BS may indicate the number K of PRACH LBT-SBs to the UE through higher layer signaling. Upon receiving information about the number K of PRACH LBT-SBs from the BS through the higher layer signaling, the UE may determine the number of frequency-domain ROs available for the UE. The higher layer signaling may be, for example, RRC signaling, and more particularly, a system information block (SIB) and/or remaining minimum system information (RMSI). The number of PRACH LBT-SBs may always be preset to the same value without signal transmission between the BS and UE. It may be determined depending on the default BW (e.g., initial active BWP) provided by the BS to the UE and/or the BW value configured by the BS to the UE for ROs.

Single Long Sequence

Instead of a length-139 PRACH sequence, a new length sequence may be configured. Considering the OCB requirement based on the LBT-SB, it is desirable that a PRACH sequence occupies at least 16 MHz. By configuring sequences with different lengths based on the SCS of a PRACH, 16 MHz or more may be occupied for each SCS. The sequence may be, for example, a ZC sequence. To configure an appropriate sequence length for each SCS, the following conditions may be considered.

1) When the ZC sequence is mapped to frequency-domain resources, the length needs to be selected such that the occupied BW is more than or equal to 16 MHz.

2) The ZC sequence length needs to be selected as a prime number. When the prime number is selected, more root indices may be used.

3) The smallest number needs to be selected from among numbers that satisfy conditions 1) and 2). There is a gain when other UL signals and/or channels are multiplexed on remaining frequency resources where no PRACH is mapped. The UL signals and/or channels may be, for example, one or more UL signals and/or channels supported by the system such as a PUSCH, a PUCCH, a PRACH, an SRS, and a DMRS.

The ZC sequence with a new length satisfying the conditions 1) to 3) may be set as follows depending on SCSs.

For the 15 kHz SCS, the sequence length may be 1069. If the sequence length is 1069, the band occupied by the PRACH becomes 1069×15=16035 kHz. The largest prime number less than 1069 is 1063. If the sequence length is 1063, the OCB requirement is not satisfied because 1063×15=15945 kHz.

In terms of frequency-domain mapping, since 89×12+1=1069, the length-1069 sequence needs to be mapped to at least 89 RBs and one subcarrier (or RE). Considering frequency division multiplexing (FDM), if the number of RBs in the 20 MHz BW is 106, 90 RBs may be used for the PRACH and 16 RBs may be used for other UL signals and/or channels. Zero padding may be performed on 11 REs in one RB among the 90 RBs used for the PRACH. The 11 zero-padded REs may be used as guard tones. Considering that SC puncturing is performed once for the PRACH sequence, 89 RBs may be used for the PRACH and 17 RBs may be used for other UL signals and/or channels.

As another example, the sequence length may be 1087 for the 15 kHz SCS. If the sequence length is 1087, the band occupied by the PRACH becomes 1087×15=16305 kHz. In terms of frequency-domain mapping, since 90×12+7=1087, the length-1087 sequence needs to be mapped to at least 90 RBs and 7 subcarriers (or REs). Accordingly, 5 REs may be used as guard tones. The number of guard tones decreases compared to the length-1069 sequence, and one RB is further occupied. In addition, the number of root indices increases by 18, compared to the length-1069 sequence.

For the 30 kHz SCS, the sequence length may be 541. If the sequence length is 541, the band occupied by the PRACH becomes 541×30=16230 kHz. The largest prime number less than 541 is 523. If the sequence length is 523, the OCB requirement is not satisfied because 523×30=15690 kHz.

In terms of frequency-domain mapping, since 45×12+1=541, the length-541 sequence needs to be mapped to at least 45 RBs and one subcarrier (or RE). Considering FDM, if the number of RBs in the 20 MHz BW is 51, 46 RBs may be used for the PRACH and 5 RBs may be used for other UL signals and/or channels. Zero padding may be performed on 11 REs in one RB among the 46 RBs used for the PRACH. The 11 zero-padded REs may be used as guard tones. Considering that SC puncturing is performed once for the PRACH sequence, 45 RBs may be used for the PRACH and 6 RBs may be used for other UL signals and/or channels.

As another example, the sequence length may be 547 for the 30 kHz SCS. If the sequence length is 547, the band occupied by the PRACH becomes 547×30=16410 kHz. In terms of frequency-domain mapping, since 45×12+8=547, the length-547 sequence needs to be mapped to at least 45 RBs and 8 subcarriers (or REs). Accordingly, 4 REs may be used as guard tones. The number of guard tones decreases compared to the length-541 sequence, and the same RBs are occupied. In addition, the number of root indices increases by 6, compared to the length-541 sequence.

For the 60 kHz SCS, the sequence length may be 269. If the sequence length is 269, the band occupied by the PRACH becomes 269×60=16140 kHz. The largest prime number less than 263 is 269. If the sequence length is 263, the OCB requirement is not satisfied because 263×60=15780 kHz.

In terms of frequency-domain mapping, since 22×12+5=269, the length-269 sequence needs to be mapped to at least 22 RBs and 5 subcarriers (or REs). Considering FDM, if the number of RBs in the 20 MHz BW is 24, 23 RBs may be used for the PRACH and one RB may be used for other UL signals and/or channels. Zero padding may be performed on 7 REs in one RB among the 23 RBs used for the PRACH. The 7 zero-padded REs may be used as guard tones.

As another example, the sequence length may be 271 for the 60 kHz SCS. If the sequence length is 271, the band occupied by the PRACH becomes 271×60=16260 kHz. In terms of frequency-domain mapping, since 22×12+7=271, the length-271 sequence needs to be mapped to at least 22 RBs and 7 subcarriers (or REs). Accordingly, 5 REs may be used as guard tones. The number of guard tones decreases compared to the length-269 sequence, and the same RBs are occupied. In addition, the number of root indices increases by 2, compared to the length-269 sequence.

In accordance with the ZC sequence with the new length, the values of the root index table and the values of the $N_{CS}$ table need to be modified. For example, when the lengths of the ZC sequence configured for the 15 kHz, 30 kHz, and 60 kHz SCSs are 1069, 541, and 469, respectively, the values of the root index table and the values of the $N_{CS}$ table may be configured as shown in FIGS. 20 to 25.

Referring to FIGS. 20, 22, and 24, the values of the root index table may be configured based on the legacy NR system. FIGS. 20, 22, and 24 show examples in which Root Index Max is arranged after 1, 2 is arranged after Root Index Max, and Root Index Max−1 is arranged after 2.

Referring to FIGS. 21, 23, and 25, the values of the $N_{CS}$ table may also be configured based on the legacy NR system. FIGS. 21, 23, and 25 show examples in which $N_{CS}$ values are configured such that a plurality of sequences generated based on the $N_{CS}$ values related to zeroCorrelationZoneConfig index values provided in the legacy NR system have a value more than or equal to the interval between peak values obtained from correlation results. Thereafter, an appropriate number of CS indices may be configured for each $N_{CS}$ value.

RO Sharing Between Concatenated PRACH and Rel-15 NR PRACH

Hereinabove, the concatenated PRACH having the same length (length-139 ZC sequence) as that of the PRACH of the legacy NR system has been described. Thus, the same RO may be shared between the proposed concatenated PRACH and the PRACH of the legacy system. As described above, the RO means time and frequency resources where a single PRACH sequence is mapped/transmitted (on consecutive frequency resources). The consecutive frequency resources may be, for example, 12 PRBs. For the concatenated PRACH, it is desirable to use a different root index and/or a different CS value for each repetitively transmitted sequence to improve the performance of peak-to-average power ratio/cube metric (PAPR/CM). When mapping the concatenated PRACH, the BS may indicate a root index offset and/or a CS offset to be applied to a sequence to be mapped to an RO on a high frequency with respect to a sequence to be mapped to an RO on a low frequency. When the PRACH sequence to be mapped to the RO on the high frequency is determined based on legacy NR PRACH mapping, the root index and/or CS value may be reconfigured based on the RAPID value of the root index offset and/or CS offset indicated by the BS.

For example, when the 30 kHz SCS is used, a total of 4 ROs may be configured in the 20 MHz BW according to the legacy NR PRACH mapping. For convenience of description, it is assumed in this document that RO #1, RO #2, RO #3, and RO #4 are RO indices arranged in ascending order in the frequency domain. In the legacy NR system, if the BS indicates that the root index and $N_{CS}$ value are 0 and 12 for PRACH transmission on four ROs, RAPIDS 0 to 63 for the four ROs may have sequence numbers u and CS values as shown in Table 6. In the legacy NR system, if the root index is 0, the actually used root value may become 1. The CS value may be defined as CS index*$N_{CS}$ as shown in Table 6.

TABLE 6

| RAPID | Sequence number u | Cyclic shift value |
|---|---|---|
| 0 | 1 | 0*12 |
| 1 | 1 | 1*12 |
| 2 | 1 | 2*12 |
| 3 | 1 | 3*12 |
| 4 | 1 | 4*12 |
| 5 | 1 | 5*12 |
| 6 | 1 | 6*12 |
| 7 | 1 | 7*12 |
| 8 | 1 | 8*12 |
| 9 | 1 | 9*12 |
| 10 | 1 | 10*12 |
| 11 | 138 | 0*12 |
| 12 | 138 | 1*12 |
| 13 | 138 | 2*12 |
| 14 | 138 | 3*12 |
| 15 | 138 | 4*12 |
| 16 | 138 | 5*12 |
| 17 | 138 | 6*12 |
| 18 | 138 | 7*12 |
| 19 | 138 | 8*12 |
| 20 | 138 | 9*12 |
| 21 | 138 | 10*12 |
| 22 | 2 | 0*12 |
| 23 | 2 | 1*12 |
| 24 | 2 | 2*12 |
| 25 | 2 | 3*12 |
| 26 | 2 | 4*12 |
| 27 | 2 | 5*12 |
| 28 | 2 | 6*12 |
| 29 | 2 | 7*12 |
| 30 | 2 | 8*12 |
| 31 | 2 | 9*12 |
| 32 | 2 | 10*12 |
| 33 | 137 | 0*12 |
| 34 | 137 | 1*12 |
| 35 | 137 | 2*12 |
| 36 | 137 | 3*12 |
| 37 | 137 | 4*12 |
| 38 | 137 | 5*12 |
| 39 | 137 | 6*12 |
| 40 | 137 | 7*12 |
| 41 | 137 | 8*12 |
| 42 | 137 | 9*12 |
| 43 | 137 | 10*12 |
| 44 | 3 | 0*12 |
| 45 | 3 | 1*12 |
| 46 | 3 | 2*12 |
| 47 | 3 | 3*12 |
| 48 | 3 | 4*12 |

TABLE 6-continued

| RAPID | Sequence number u | Cyclic shift value |
|---|---|---|
| 49 | 3 | 5*12 |
| 50 | 3 | 6*12 |
| 51 | 3 | 7*12 |
| 52 | 3 | 8*12 |
| 53 | 3 | 9*12 |
| 54 | 3 | 10*12 |
| 55 | 136 | 0*12 |
| 56 | 136 | 1*12 |
| 57 | 136 | 2*12 |
| 58 | 136 | 3*12 |
| 59 | 136 | 4*12 |
| 60 | 136 | 5*12 |
| 61 | 136 | 6*12 |
| 62 | 136 | 7*12 |
| 63 | 136 | 8*12 |

For example, according to the concatenated PRACH mapping method, when RO #1 and RO #4 are occupied and the CS offset is given by k, RAPIDs 0 to 63 of RO #1 occupied on a low frequency by the concatenated PRACH mapping and RAPIDs 0 to 63 of an RO not occupied by the concatenated PRACH mapping may have sequence numbers u and CS values as shown in Table 7. On the other hand, RAPIDs 0 to 63 of RO #4 occupied on a high frequency by the concatenated PRACH mapping may have sequence numbers u and CS values different from those of Table 7 as shown in Table 8. Here, the CS value may be defined by CS value=(CS index×$N_{CS}$+k) mod $L_{RA}$, where $L_{RA}$=139. In addition, mod denotes a modulation operation. That is, A mod B means a remainder of dividing A by B. For example, the CS offset k may be 1. The UE and BS may perform the RACH process in RO #4 based on the RAPIDs configured by combining the sequence numbers u and CS values as shown in Table 7.

TABLE 7

| RAPID | Sequence number u | Cyclic shift value |
|---|---|---|
| 0 | 1 | (0*12 + k) mod 139 |
| 1 | 1 | (1*12 + k) mod 139 |
| 2 | 1 | (2*12 + k) mod 139 |
| 3 | 1 | (3*12 + k) mod 139 |
| 4 | 1 | (4*12 + k) mod 139 |
| 5 | 1 | (5*12 + k) mod 139 |
| 6 | 1 | (6*12 + k) mod 139 |
| 7 | 1 | (7*12 + k) mod 139 |
| 8 | 1 | (8*12 + k) mod 139 |
| 9 | 1 | (9*12 + k) mod 139 |
| 10 | 1 | (10*12 + k) mod 139 |
| 11 | 138 | (0*12 + k) mod 139 |
| 12 | 138 | (1*12 + k) mod 139 |
| 13 | 138 | (2*12 + k) mod 139 |
| 14 | 138 | (3*12 + k) mod 139 |
| 15 | 138 | (4*12 + k) mod 139 |
| 16 | 138 | (5*12 + k) mod 139 |
| 17 | 138 | (6*12 + k) mod 139 |
| 18 | 138 | (7*12 + k) mod 139 |
| 19 | 138 | (8*12 + k) mod 139 |
| 20 | 138 | (9*12 + k) mod 139 |
| 21 | 138 | (10*12 + k) mod 139 |
| 22 | 2 | (0*12 + k) mod 139 |
| 23 | 2 | (1*12 + k) mod 139 |
| 24 | 2 | (2*12 + k) mod 139 |
| 25 | 2 | (3*12 + k) mod 139 |
| 26 | 2 | (4*12 + k) mod 139 |
| 27 | 2 | (5*12 + k) mod 139 |
| 28 | 2 | (6*12 + k) mod 139 |
| 29 | 2 | (7*12 + k) mod 139 |
| 30 | 2 | (8*12 + k) mod 139 |

TABLE 7-continued

| RAPID | Sequence number u | Cyclic shift value |
|---|---|---|
| 31 | 2 | (9*12 + k) mod 139 |
| 32 | 2 | (10*12 + k) mod 139 |
| 33 | 137 | (0*12 + k) mod 139 |
| 34 | 137 | (1*12 + k) mod 139 |
| 35 | 137 | (2*12 + k) mod 139 |
| 36 | 137 | (3*12 + k) mod 139 |
| 37 | 137 | (4*12 + k) mod 139 |
| 38 | 137 | (5*12 + k) mod 139 |
| 39 | 137 | (6*12 + k) mod 139 |
| 40 | 137 | (7*12 + k) mod 139 |
| 41 | 137 | (8*12 + k) mod 139 |
| 42 | 137 | (9*12 + k) mod 139 |
| 43 | 137 | (10*12 + k) mod 139 |
| 44 | 3 | (0*12 + k) mod 139 |
| 45 | 3 | (1*12 + k) mod 139 |
| 46 | 3 | (2*12 + k) mod 139 |
| 47 | 3 | (3*12 + k) mod 139 |
| 48 | 3 | (4*12 + k) mod 139 |
| 49 | 3 | (5*12 + k) mod 139 |
| 50 | 3 | (6*12 + k) mod 139 |
| 51 | 3 | (7*12 + k) mod 139 |
| 52 | 3 | (8*12 + k) mod 139 |
| 53 | 3 | (9*12 + k) mod 139 |
| 54 | 3 | (10*12 + k) mod 139 |
| 55 | 136 | (0*12 + k) mod 139 |
| 56 | 136 | (1*12 + k) mod 139 |
| 57 | 136 | (2*12 + k) mod 139 |
| 58 | 136 | (3*12 + k) mod 139 |
| 59 | 136 | (4*12 + k) mod 139 |
| 60 | 136 | (5*12 + k) mod 139 |
| 61 | 136 | (6*12 + k) mod 139 |
| 62 | 136 | (7*12 + k) mod 139 |
| 63 | 136 | (8*12 + k) mod 139 |

As another example, according to the concatenated PRACH mapping method, RO #1, RO #2, RO #3, and RO #4 may be occupied, and the CS offset may be given by k. In this case, Table 6 may correspond to RAPID combinations for only RO #1, and Table 7 may correspond to RAPID combinations for RO #2. For RAPID combinations for RO #3, k in Table 7 may be substituted with 2k in order to determine CS values. For RAPID combinations for RO #4, k in Table 7 may be substituted with 3k in order to determine CS values. Meanwhile, when the root index offset is considered, RAPID combinations for each RO may vary according to sequence numbers determined based on the root index offset value.

Additionally, RO sharing methods based on RAPIDs depending on the SCS value of a PRACH preamble are also proposed. The BS may indicate the values of X and/or Y, which will be described below, through higher layer signaling. The higher layer signaling may be, for example, RRC signaling. More specifically, the higher layer signaling may be SIB-1 and/or RMSI. The UE may use RAPIDs based on the higher layer signaling received from the BS. The BS and UE may perform the RACH process based on the indicated X and/or Y values. Hereinafter, examples in which X and/or Y are configured will be described.

For the 30 kHz SCS, four ROs may be configured and/or set in a bandwidth of 20 MHz, and concatenated PRACH mapping may be performed over all four ROs. According to the above-described concatenated PRACH, combinations of four sequences mapped to four ROs may be simultaneously transmitted on a single PRACH. For example, X RAPIDs on four ROs: RO #1, RO #2, RO #3, and RO #4 may be used for the concatenated PRACH mapping. In the case of the PRACH of the legacy NR system, one sequence mapped to one RO may be transmitted over a single PRACH. Therefore, Y RAPIDs on RO #1 among the four ROs may be used for PRACH mapping of the legacy NR system. Y RAPIDs on RO #2 may be used for the PRACH mapping of the legacy NR system. Y RAPIDs on RO #3 may be used for the PRACH mapping of the legacy NR system. Y RAPIDs on RO #4 may be used for the PRACH mapping of the legacy NR system. X+Y corresponds to the total number of RAPIDs used on a single RO. For example, X+Y may be 64. In addition, X RAPIDs configured for the concatenated PRACH and Y RAPIDs configured for the PRACH of the legacy NR system may be configured to be mutually exclusive. Meanwhile, an RAPID may be determined by a combination of a CS value and a root index used to generate a PRACH sequence. When two RAPIDs are mutually exclusive, it may mean that CS values and/or root index values that determine the two RAPIDs are set to be different.

For the 30 kHz SCS, four ROs may be configured and/or set in a bandwidth of 20 MHz, and concatenated PRACH mapping may be performed over two ROs. According to the above-described concatenated PRACH, combinations of two sequences mapped to two ROs may be simultaneously transmitted on a single PRACH. For example, X RAPIDs on two ROs: RO #1 and RO #4 may be used for the concatenated PRACH mapping. Thus, Y RAPIDs on RO #1 among the four ROs may be used for PRACH mapping of the legacy NR system, and Y RAPIDs on RO #2 may be used for the PRACH mapping of the legacy NR system. Since the concatenated PRACH is not mapped to RO #2 and RO #3, whole (or all) RAPIDs on RO #2 may be used for the PRACH mapping of the legacy NR system, and whole (or all) RAPIDs on RO #3 may be used for the PRACH mapping of the legacy NR system. X+Y corresponds to the total number of RAPIDs used on a single RO. For example, X+Y may be 64. In addition, X RAPIDs configured for the concatenated PRACH and Y RAPIDs configured for the PRACH of the legacy NR system on RO #1 and RO #4 may be configured to be mutually exclusive. Meanwhile, an RAPID may be determined by a combination of a CS value and a root index used to generate a PRACH sequence. When two RAPIDs are mutually exclusive, it may mean that CS values and/or root index values that determine the two RAPIDs are set to be different.

For the 30 kHz SCS, four ROs may be configured and/or set in a bandwidth of 20 MHz, and concatenated PRACH mapping may be performed over two ROs. In this case, whole (or all) RAPIDs on the two ROs may be used for the concatenated PRACH mapping. For example, all RAPIDs on two ROs: RO #1 and RO #4 may be used for the concatenated PRACH mapping. On the other hand, whole (or all) RAPIDs on RO #2 may be used for PRACH mapping of the legacy NR system, and whole (or all) RAPIDs on RO #3 may be used for the PRACH mapping of the legacy NR system.

For the 15 kHz SCS, 8 ROs may be configured and/or set in a bandwidth of 20 MHz, and concatenated PRACH mapping may be performed over all 8 ROs. According to the above-described concatenated PRACH, combinations of 8 sequences mapped to 8 ROs may be simultaneously transmitted on a single PRACH. For example, X RAPIDs on 8 ROs: RO #1, RO #2, RO #3, RO #4, RO #5, RO #6, RO #7, and RO #8 may be used for the concatenated PRACH mapping. Therefore, Y RAPIDs on RO #1 among the 8 ROs may be used for PRACH mapping of the legacy NR system. Y RAPIDs on RO #2 may be used for the PRACH mapping of the legacy NR system. Y RAPIDs on RO #3 may be used for the PRACH mapping of the legacy NR system. Y RAPIDs on RO #4 may be used for the PRACH mapping of the legacy NR system. Y RAPIDs on RO #5 may be used for the PRACH mapping of the legacy NR system. Y RAPIDs on RO #6 may be used for the PRACH mapping of the legacy NR system. Y RAPIDs on RO #7 may be used for the PRACH mapping of the legacy NR system. Y RAPIDs on RO #8 may be used for the PRACH mapping of the legacy NR system. X+Y corresponds to the total number of RAPIDs used on a single RO. For example, X+Y may be 64. In addition, X RAPIDs configured for the concatenated PRACH and Y RAPIDs configured for the PRACH of the legacy NR system may be configured to be mutually exclusive. Meanwhile, an RAPID may be determined by a combination of a CS value and a root index used to generate a PRACH sequence. When two RAPIDs are mutually exclusive, it may mean that CS values and/or root index values that determine the two RAPIDs are set to be different.

For the 15 kHz SCS, 8 ROs may be configured and/or set in a bandwidth of 20 MHz, and concatenated PRACH mapping may be performed over four ROs. According to the above-described concatenated PRACH, combinations of four sequences mapped to four ROs may be simultaneously transmitted on a single PRACH. For example, X RAPIDs on four ROs: RO #1, RO #3, RO #5, and RO #7 may be used for the concatenated PRACH mapping, and X RAPIDs on four ROs: RO #2, RO #4, RO #6, and RO #8 may be used for the concatenated PRACH mapping. Thus, Y RAPIDs on RO #1 among the 8 ROs may be used for PRACH mapping of the legacy NR system. Y RAPIDs on RO #2 may be used for the PRACH mapping of the legacy NR system. Y RAPIDs on RO #3 may be used for the PRACH mapping of the legacy NR system. Y RAPIDs on RO #4 may be used for the PRACH mapping of the legacy NR system. Y RAPIDs on RO #5 may be used for the PRACH mapping of the legacy NR system. Y RAPIDs on RO #6 may be used for the PRACH mapping of the legacy NR system. Y RAPIDs on RO #7 may be used for the PRACH mapping of the legacy NR system. Y RAPIDs on RO #8 may be used for the PRACH mapping of the legacy NR system. X+Y corresponds to the total number of RAPIDs used on a single RO. For example, X+Y may be 64. In addition, X RAPIDs configured for the concatenated PRACH and Y RAPIDs configured for the PRACH of the legacy NR system may be configured to be mutually exclusive. Meanwhile, an RAPID may be determined by a combination of a CS value and a root index used to generate a PRACH sequence. When two RAPIDs are mutually exclusive, it may mean that CS values and/or root index values that determine the two RAPIDs are set to be different.

For the 15 kHz SCS, 8 ROs may be configured and/or set in a bandwidth of 20 MHz, and concatenated PRACH mapping may be performed over two ROs. According to the above-described concatenated PRACH, combinations of two sequences mapped to two ROs may be simultaneously transmitted on a single PRACH. For example, X RAPIDs on two ROs: RO #1 and RO #7 may be used for the concatenated PRACH mapping, and X RAPIDs on two ROs: RO #2 and RO #8 may be used for the concatenated PRACH mapping. Thus, Y RAPIDs on RO #1 among the 8 ROs may be used for PRACH mapping of the legacy NR system. Y RAPIDs on RO #2 may be used for the PRACH mapping of the legacy NR system. Y RAPIDs on RO #7 may be used for the PRACH mapping of the legacy NR system. Y RAPIDs on RO #8 may be used for the PRACH mapping of the legacy NR system. Since the concatenated PRACH is not mapped to RO #2, RO #3, RO #4, and RO #5, whole (or all) RAPIDs on RO #2 may be used for the PRACH mapping of the legacy NR system. In addition, whole (or all) RAPIDs on RO #3 may be used for the PRACH mapping of the legacy NR system, whole (or all) RAPIDs on RO #4 may be used for the PRACH mapping of the legacy NR system, and whole (or all) RAPIDs on RO #5 may be used for the PRACH mapping of the legacy NR system. X+Y corresponds to the total number of RAPIDs used on a single RO. For example, X+Y may be 64. In addition, X RAPIDs configured for the concatenated PRACH and Y RAPIDs configured for the PRACH of the legacy NR system on RO #1 and RO #4 may be configured to be mutually exclusive. Meanwhile, an RAPID may be determined by a combination of a CS value and a root index used to generate a PRACH sequence. When two RAPIDs are mutually exclusive, it may mean that CS values and/or root index values that determine the two RAPIDs are set to be different.

For the 15 kHz SCS, 8 ROs may be configured and/or set in a bandwidth of 20 MHz, and concatenated PRACH mapping may be performed over two ROs. In this case, whole (or all) RAPIDs on the two ROs may be used for the concatenated PRACH mapping. For example, all RAPIDs on two ROs: RO #1 and RO #7 may be used for the concatenated PRACH mapping, and all RAPIDs on two ROs: RO #2 and RO #8 may be used for the concatenated PRACH mapping. On the other hand, whole (or all) RAPIDs on RO #3 may be used for PRACH mapping of the legacy NR system. Whole (or all) RAPIDs on RO #3 may be used for the PRACH mapping of the legacy NR system. Whole (or all) RAPIDs on RO #4 may be used for the PRACH mapping of the legacy NR system. Whole (or all) RAPIDs on RO #5 may be used for the PRACH mapping of the legacy NR system. Whole (or all) RAPIDs on RO #6 may be used for the PRACH mapping of the legacy NR system.

For convenience of understanding, it is assumed that for the 30 kHz SCS, four ROs are configured and/or set in a bandwidth of 20 MHz and concatenated PRACH mapping is performed over two ROs. For the 30 kHz SCS, when the four ROs are configured and/or set in the 20 MHz bandwidth and the concatenated PRACH mapping is performed over the two ROs, RAPID combinations for each RO may be configured as shown in Tables 8 to 10. Table 8 shows RAPID combinations for RO #1. Table 9 shows RAPID combinations for RO #2 and RO #3. Table 10 shows RAPID combinations for RO #4. In Tables 8 to 10, it is assumed that the root index is 0, the NCS is 12, the CS offset is k, X is 40, and Y is 24. X corresponds to 0 to 39 among 64 RAPIDs, and Y corresponds to 40 to 63 among the 64 RAPIDs.

TABLE 8

| RAPID | Usage | Sequence number u | Cyclic shift value |
|---|---|---|---|
| 0 | Concatenated | 1 | 0*12 |
| 1 | Concatenated | 1 | 1*12 |
| 2 | Concatenated | 1 | 2*12 |
| 3 | Concatenated | 1 | 3*12 |
| 4 | Concatenated | 1 | 4*12 |
| 5 | Concatenated | 1 | 5*12 |
| 6 | Concatenated | 1 | 6*12 |
| 7 | Concatenated | 1 | 7*12 |
| 8 | Concatenated | 1 | 8*12 |
| 9 | Concatenated | 1 | 9*12 |
| 10 | Concatenated | 1 | 10*12 |
| 11 | Concatenated | 138 | 0*12 |
| 12 | Concatenated | 138 | 1*12 |
| 13 | Concatenated | 138 | 2*12 |
| 14 | Concatenated | 138 | 3*12 |
| 15 | Concatenated | 138 | 4*12 |
| 16 | Concatenated | 138 | 5*12 |
| 17 | Concatenated | 138 | 6*12 |

TABLE 8-continued

| RAPID | Usage | Sequence number u | Cyclic shift value |
|---|---|---|---|
| 18 | Concatenated | 138 | 7*12 |
| 19 | Concatenated | 138 | 8*12 |
| 20 | Concatenated | 138 | 9*12 |
| 21 | Concatenated | 138 | 10*12 |
| 22 | Concatenated | 2 | 0*12 |
| 23 | Concatenated | 2 | 1*12 |
| 24 | Concatenated | 2 | 2*12 |
| 25 | Concatenated | 2 | 3*12 |
| 26 | Concatenated | 2 | 4*12 |
| 27 | Concatenated | 2 | 5*12 |
| 28 | Concatenated | 2 | 6*12 |
| 29 | Concatenated | 2 | 7*12 |
| 30 | Concatenated | 2 | 8*12 |
| 31 | Concatenated | 2 | 9*12 |
| 32 | Concatenated | 2 | 10*12 |
| 33 | Concatenated | 137 | 0*12 |
| 34 | Concatenated | 137 | 1*12 |
| 35 | Concatenated | 137 | 2*12 |
| 36 | Concatenated | 137 | 3*12 |
| 37 | Concatenated | 137 | 4*12 |
| 38 | Concatenated | 137 | 5*12 |
| 39 | Concatenated | 137 | 6*12 |
| 40 | NR PRACH | 137 | 7*12 |
| 41 | NR PRACH | 137 | 8*12 |
| 42 | NR PRACH | 137 | 9*12 |
| 43 | NR PRACH | 137 | 10*12 |
| 44 | NR PRACH | 3 | 0*12 |
| 45 | NR PRACH | 3 | 1*12 |
| 46 | NR PRACH | 3 | 2*12 |
| 47 | NR PRACH | 3 | 3*12 |
| 48 | NR PRACH | 3 | 4*12 |
| 49 | NR PRACH | 3 | 5*12 |
| 50 | NR PRACH | 3 | 6*12 |
| 51 | NR PRACH | 3 | 7*12 |
| 52 | NR PRACH | 3 | 8*12 |
| 53 | NR PRACH | 3 | 9*12 |
| 54 | NR PRACH | 3 | 10*12 |
| 55 | NR PRACH | 136 | 0*12 |
| 56 | NR PRACH | 136 | 1*12 |
| 57 | NR PRACH | 136 | 2*12 |
| 58 | NR PRACH | 136 | 3*12 |
| 59 | NR PRACH | 136 | 4*12 |
| 60 | NR PRACH | 136 | 5*12 |
| 61 | NR PRACH | 136 | 6*12 |
| 62 | NR PRACH | 136 | 7*12 |
| 63 | NR PRACH | 136 | 8*12 |

TABLE 9

| RAPID | Usage | Sequence number u | Cyclic shift value |
|---|---|---|---|
| 0 | NR PRACH | 1 | 0*12 |
| 1 | NR PRACH | 1 | 1*12 |
| 2 | NR PRACH | 1 | 2*12 |
| 3 | NR PRACH | 1 | 3*12 |
| 4 | NR PRACH | 1 | 4*12 |
| 5 | NR PRACH | 1 | 5*12 |
| 6 | NR PRACH | 1 | 6*12 |
| 7 | NR PRACH | 1 | 7*12 |
| 8 | NR PRACH | 1 | 8*12 |
| 9 | NR PRACH | 1 | 9*12 |
| 10 | NR PRACH | 1 | 10*12 |
| 11 | NR PRACH | 138 | 0*12 |
| 12 | NR PRACH | 138 | 1*12 |
| 13 | NR PRACH | 138 | 2*12 |
| 14 | NR PRACH | 138 | 3*12 |
| 15 | NR PRACH | 138 | 4*12 |
| 16 | NR PRACH | 138 | 5*12 |
| 17 | NR PRACH | 138 | 6*12 |
| 18 | NR PRACH | 138 | 7*12 |
| 19 | NR PRACH | 138 | 8*12 |
| 20 | NR PRACH | 138 | 9*12 |
| 21 | NR PRACH | 138 | 10*12 |

TABLE 9-continued

| RAPID | Usage | Sequence number u | Cyclic shift value |
|---|---|---|---|
| 22 | NR PRACH | 2 | 0*12 |
| 23 | NR PRACH | 2 | 1*12 |
| 24 | NR PRACH | 2 | 2*12 |
| 25 | NR PRACH | 2 | 3*12 |
| 26 | NR PRACH | 2 | 4*12 |
| 27 | NR PRACH | 2 | 5*12 |
| 28 | NR PRACH | 2 | 6*12 |
| 29 | NR PRACH | 2 | 7*12 |
| 30 | NR PRACH | 2 | 8*12 |
| 31 | NR PRACH | 2 | 9*12 |
| 32 | NR PRACH | 2 | 10*12 |
| 33 | NR PRACH | 137 | 0*12 |
| 34 | NR PRACH | 137 | 1*12 |
| 35 | NR PRACH | 137 | 2*12 |
| 36 | NR PRACH | 137 | 3*12 |
| 37 | NR PRACH | 137 | 4*12 |
| 38 | NR PRACH | 137 | 5*12 |
| 39 | NR PRACH | 137 | 6*12 |
| 40 | NR PRACH | 137 | 7*12 |
| 41 | NR PRACH | 137 | 8*12 |
| 42 | NR PRACH | 137 | 9*12 |
| 43 | NR PRACH | 137 | 10*12 |
| 44 | NR PRACH | 3 | 0*12 |
| 45 | NR PRACH | 3 | 1*12 |
| 46 | NR PRACH | 3 | 2*12 |
| 47 | NR PRACH | 3 | 3*12 |
| 48 | NR PRACH | 3 | 4*12 |
| 49 | NR PRACH | 3 | 5*12 |
| 50 | NR PRACH | 3 | 6*12 |
| 51 | NR PRACH | 3 | 7*12 |
| 52 | NR PRACH | 3 | 8*12 |
| 53 | NR PRACH | 3 | 9*12 |
| 54 | NR PRACH | 3 | 10*12 |
| 55 | NR PRACH | 136 | 0*12 |
| 56 | NR PRACH | 136 | 1*12 |
| 57 | NR PRACH | 136 | 2*12 |
| 58 | NR PRACH | 136 | 3*12 |
| 59 | NR PRACH | 136 | 4*12 |
| 60 | NR PRACH | 136 | 5*12 |
| 61 | NR PRACH | 136 | 6*12 |
| 62 | NR PRACH | 136 | 7*12 |
| 63 | NR PRACH | 136 | 8*12 |

TABLE 10

| RAPID | Usage | Sequence number u | Cyclic shift value |
|---|---|---|---|
| 0 | Concatenated | 1 | (0*12 + k) mod 139 |
| 1 | Concatenated | 1 | (1*12 + k) mod 139 |
| 2 | Concatenated | 1 | (2*12 + k) mod 139 |
| 3 | Concatenated | 1 | (3*12 + k) mod 139 |
| 4 | Concatenated | 1 | (4*12 + k) mod 139 |
| 5 | Concatenated | 1 | (5*12 + k) mod 139 |
| 6 | Concatenated | 1 | (6*12 + k) mod 139 |
| 7 | Concatenated | 1 | (7*12 + k) mod 139 |
| 8 | Concatenated | 1 | (8*12 + k) mod 139 |
| 9 | Concatenated | 1 | (9*12 + k) mod 139 |
| 10 | Concatenated | 1 | (10*12 + k) mod 139 |
| 11 | Concatenated | 138 | (0*12 + k) mod 139 |
| 12 | Concatenated | 138 | (1*12 + k) mod 139 |
| 13 | Concatenated | 138 | (2*12 + k) mod 139 |
| 14 | Concatenated | 138 | (3*12 + k) mod 139 |
| 15 | Concatenated | 138 | (4*12 + k) mod 139 |
| 16 | Concatenated | 138 | (5*12 + k) mod 139 |
| 17 | Concatenated | 138 | (6*12 + k) mod 139 |
| 18 | Concatenated | 138 | (7*12 + k) mod 139 |
| 19 | Concatenated | 138 | (8*12 + k) mod 139 |
| 20 | Concatenated | 138 | (9*12 + k) mod 139 |
| 21 | Concatenated | 138 | (10*12 + k) mod 139 |
| 22 | Concatenated | 2 | (0*12 + k) mod 139 |
| 23 | Concatenated | 2 | (1*12 + k) mod 139 |
| 24 | Concatenated | 2 | (2*12 + k) mod 139 |
| 25 | Concatenated | 2 | (3*12 + k) mod 139 |
| 26 | Concatenated | 2 | (4*12 + k) mod 139 |
| 27 | Concatenated | 2 | (5*12 + k) mod 139 |
| 28 | Concatenated | 2 | (6*12 + k) mod 139 |
| 29 | Concatenated | 2 | (7*12 + k) mod 139 |
| 30 | Concatenated | 2 | (8*12 + k) mod 139 |
| 31 | Concatenated | 2 | (9*12 + k) mod 139 |
| 32 | Concatenated | 2 | (10*12 + k) mod 139 |
| 33 | Concatenated | 137 | (0*12 + k) mod 139 |
| 34 | Concatenated | 137 | (1*12 + k) mod 139 |
| 35 | Concatenated | 137 | (2*12 + k) mod 139 |
| 36 | Concatenated | 137 | (3*12 + k) mod 139 |
| 37 | Concatenated | 137 | (4*12 + k) mod 139 |
| 38 | Concatenated | 137 | (5*12 + k) mod 139 |
| 39 | Concatenated | 137 | (6*12 + k) mod 139 |
| 40 | NR PRACH | 137 | (7*12 + k) mod 139 |
| 41 | NR PRACH | 137 | (8*12 + k) mod 139 |
| 42 | NR PRACH | 137 | (9*12 + k) mod 139 |
| 43 | NR PRACH | 137 | (10*12 + k) mod 139 |
| 44 | NR PRACH | 3 | (0*12 + k) mod 139 |
| 45 | NR PRACH | 3 | (1*12 + k) mod 139 |
| 46 | NR PRACH | 3 | (2*12 + k) mod 139 |
| 47 | NR PRACH | 3 | (3*12 + k) mod 139 |
| 48 | NR PRACH | 3 | (4*12 + k) mod 139 |
| 49 | NR PRACH | 3 | (5*12 + k) mod 139 |
| 50 | NR PRACH | 3 | (6*12 + k) mod 139 |

TABLE 10-continued

| RAPID | Usage | Sequence number u | Cyclic shift value |
|---|---|---|---|
| 51 | NR PRACH | 3 | (7*12 + k) mod 139 |
| 52 | NR PRACH | 3 | (8*12 + k) mod 139 |
| 53 | NR PRACH | 3 | (9*12 + k) mod 139 |
| 54 | NR PRACH | 3 | (10*12 + k) mod 139 |
| 55 | NR PRACH | 136 | (0*12 + k) mod 139 |
| 56 | NR PRACH | 136 | (1*12 + k) mod 139 |
| 57 | NR PRACH | 136 | (2*12 + k) mod 139 |
| 58 | NR PRACH | 136 | (3*12 + k) mod 139 |
| 59 | NR PRACH | 136 | (4*12 + k) mod 139 |
| 60 | NR PRACH | 136 | (5*12 + k) mod 139 |
| 61 | NR PRACH | 136 | (6*12 + k) mod 139 |
| 62 | NR PRACH | 136 | (7*12 + k) mod 139 |
| 63 | NR PRACH | 136 | (8*12 + k) mod 139 |

Embodiments

Embodiments may be implemented by organically combining at least one of the above-described operations.

FIG. 26 shows one of the embodiments that can be implemented by a combination of the above-described operations.

A UE may transmit a first PRACH to a BS (S2601) and receive an RAR in response to the first PRACH from the BS (S2603). In this case, the first PRACH may be one of an interlaced PRACH with a single PRB, an interlaced PRACH with 6 PRBs, a concatenated PRACH, an L-times concatenated PRACH, and a single long sequence PRACH, which are proposed in the present disclosure. For example, the first PRACH may be configured by repeatedly mapping a PRACH sequence of a specific length, which is mapped to 12 consecutive PRBs, multiple times in the frequency domain. A different root index and/or a different CS value may be configured for each of the repeatedly mapped PRACH sequences.

The frequency-domain locations of the PRACH sequences may be determined based on an SCS. The specific length of the PRACH sequence may be 139. If the specific length of the PRACH sequence is 139, the location of zero padding may be configured as described above with reference to FIGS. 10 to 25. For example, zero padding may be performed on two REs with the lowest indices and three REs with the highest indices among 144 REs included in the 12 consecutive PRBs. In addition, when the PRACH sequence is repeatedly mapped multiple times in the frequency domain, zero padding may be performed at the same location in each of the 12 consecutive PRBs.

One RO may be configured based on the PRACH sequences repeated multiple times. The one RO may be configured to be used for a second PRACH different from the first PRACH. The second PRACH may be configured without repeating the PRACH sequence of the specific length, which is mapped to the 12 consecutive PRBs, in the frequency domain. Preferably, the second PRACH may be a PRACH used in the legacy NR system. Among RAPIDs associated with one RO, several RAPIDs may be used for the first PRACH, and several remaining RAPIDs may be used for the second PRACH.

In addition to the above-described operation of FIG. 26, one or more of the operations described before with reference to FIGS. 1 to 25 may further be performed in combination.

Discontinuous Reception (DRX) Operation

The UE may perform a DRX operation, while performing the afore-described/proposed procedures and/or methods. A UE configured with DRX may reduce power consumption by discontinuously receiving a DL signal. DRX may be performed in an RRC_IDLE state, an RRC_INACTIVE state, and an RRC_CONNECTED stated. DRX is used for discontinuous reception of a paging signal in the RRC_IDLE state and the RRC_INACTIVE state. Now, DRX performed in the RRC_CONNECTED state (RRC_CONNECTED DRX) will be described below.

FIG. 27 is a diagram illustrating a DRX cycle (RRC_CONNECTED state).

Referring to FIG. 27, the DRX cycle includes On Duration and Opportunity for DRX. The DRX cycle defines a time interval in which On Duration is periodically repeated. On Duration is a time period during which the UE monitors to receive a PDCCH. When DRX is configured, the UE performs PDCCH monitoring during the On Duration. When there is any successfully detected PDCCH during the PDCCH monitoring, the UE operates an inactivity timer and is maintained in an awake state. On the other hand, when there is no successfully detected PDCCH during the PDCCH monitoring, the UE enters a sleep state, when the On Duration ends. Therefore, if DRX is configured, PDCCH monitoring/reception may be performed discontinuously in the time domain, when the afore-described/proposed procedures and/or methods are performed. For example, if DRX is configured, PDCCH reception occasions (e.g., slots having PDCCH search spaces) may be configured discontinuously according to a DRX configuration in the present disclosure. On the contrary, if DRX is not configured, PDCCH monitoring/reception may be performed continuously in the time domain, when the afore-described/proposed procedures and/or methods are performed. For example, if DRX is not configured, PDCCH reception occasions (e.g., slots having PDCCH search spaces) may be configured continuously in the present disclosure. PDCCH monitoring may be limited in a time period configured as a measurement gap, irrespective of whether DRX is configured.

Table 11 describes a UE operation related to DRX (in the RRC_CONNECTED state). Referring to Table 11, DRX configuration information is received by higher-layer (RRC) signaling, and DRX ON/OFF is controlled by a DRX command of the MAC layer. Once DRX is configured, the UE may perform PDCCH monitoring discontinuously in performing the described/proposed procedures and/or methods according to the present disclosure, as illustrated in FIG. 27.

TABLE 11

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |

TABLE 11-continued

| Type of signals | UE procedure |
| --- | --- |
| 3<sup>rd</sup> Step — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the length of the starting duration of a DRX cycle.

Value of drx-InactivityTimer: defines the length of a time duration in which the UE is in the awake state after a PDCCH occasion in which a PDCCH indicating initial UL or DL data has been detected.

Value of drx-HARQ-RTT-TimerDL: defines the length of a maximum time duration from reception of a DL initial transmission to reception of a DL retransmission.

Value of drx-HARQ-RTT-TimerDL: defines the length of a maximum time duration from reception of a grant for a DL initial transmission to reception of a grant for a UL retransmission.

drx-LongCycleStartOffset: defines the time duration and starting time of a DRX cycle.

drx-ShortCycle (optional): defines the time duration of a short DRX cycle.

When at least one of drx-OnDurationTimer, drx-InactivityTimer, drx-HARQ-RTT-TimerDL, or drx-HARQ-RTT-TimerDL is running, the UE performs PDCCH monitoring in each PDCCH occasion, while staying in the awake state.

Before the operations described above with reference to FIG. 26 (for example, before step S2601), the UE may perform DRX-related operations. The UE performs PDCCH monitoring during the ON duration. If the UE successfully detects any PDCCH during the PDCCH monitoring, the UE may perform at least one random access procedure according to embodiments of the present disclosure.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 28 illustrates a communication system 1 applied to the present disclosure.

Referring to FIG. 28, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

FIG. 29 illustrates wireless devices applicable to the present disclosure.

Referring to FIG. 29, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 28.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

FIG. 30 illustrates another example of a wireless device applied to the present disclosure. The wireless device may be implemented in various forms according to a use case/service (refer to FIG. 28).

Referring to FIG. 30, wireless devices 100 and 200 may correspond to the wireless devices 100 and 200 of FIG. 29 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 29. For example, the transceiver(s) 114 may include the one or more transceivers 106 and 206 and/or the one or more antennas 108 and 208 of FIG. 29. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 28), the vehicles (100b-1 and 100b-2 of FIG. 28), the XR device (100c of FIG. 28), the hand-held device (100d of FIG. 28), the home appliance (100e of FIG. 28), the IoT device (100f of FIG. 28), a digital broadcasting terminal, a hologram device, a public safety device, an MTC device, a medical device, a FinTech device (or a finance device), a security device, a climate/environment device, the AI server/device (400 of FIG. 28), the BSs (200 of FIG. 28), a network node, or the like. The wireless device may be mobile or fixed according to a use case/service.

In FIG. 30, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Example of Vehicle or Autonomous Driving Vehicle to which the Present Disclosure is Applied FIG. 31 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 31, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 31, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

As described above, the present disclosure is applicable to various wireless communication systems.

The invention claimed is:

1. A method of transmitting and receiving a signal by a user equipment (UE) in a wireless communication system, the method comprising:
   transmitting a first physical random access channel (PRACH); and
   receiving a random access response (RAR) based on the first PRACH,
   wherein the first PRACH is configured by repeatedly mapping a PRACH sequence of a specific length a plurality of times in a frequency domain, and
   wherein the PRACH sequence is mapped to 12 consecutive physical resource blocks (PRBs),
   wherein one random access channel occasion (RO) is configured based on the PRACH sequence repeated the plurality of times,
   wherein the one RO is configured to be available for a second PRACH,
   wherein the second PRACH is configured without repeating the PRACH sequence of the specific length mapped to the 12 consecutive PRBs in the frequency domain, and
   wherein among random access preamble identifiers (RAPIDs) related to the one RO, several RAPIDs are used for the first PRACH, and remaining RAPIDs are used for the second PRACH.

2. The method of claim 1, where frequency-domain locations of PRACH sequences are determined based on a subcarrier spacing (SCS).

3. The method of claim 1, wherein the specific length is 139,
   wherein zero padding is performed on two resource elements (REs) with lowest indices and three REs with highest indices among 144 REs included in the 12 consecutive PRBs, and
   wherein based on that the PRACH sequence is repeatedly mapped the plurality of times in the frequency domain, the zero padding is performed at same locations in each of the 12 consecutive PRBs.

4. The method of claim 1, wherein a different root index and/or a different cyclic shift (CS) value is configured for each of PRACH sequences.

5. A user equipment (UE) configured to transmit and receive a signal in a wireless communication system, the UE comprising:
   at least one transceiver;
   at least one processor; and
   at least one memory operably connected to the at least one processor and configured to store instructions that, when executed, cause the at least one processor to perform operations comprising:
   transmitting a first physical random access channel (PRACH); and
   receiving a random access response (RAR) based on the first PRACH,
   wherein the first PRACH is configured by repeatedly mapping a PRACH sequence of a specific length a plurality of times in a frequency domain, and
   wherein the PRACH sequence is mapped to 12 consecutive physical resource blocks (PRBs),
   wherein one random access channel occasion (RO) is configured based on the PRACH sequence repeated the plurality of times,
   wherein the one RO is configured to be available for a second PRACH,
   wherein the second PRACH is configured without repeating the PRACH sequence of the specific length mapped to the 12 consecutive PRBs in the frequency domain, and
   wherein among random access preamble identifiers (RAPIDs) related to the one RO, several RAPIDs are used for the first PRACH, and remaining RAPIDs are used for the second PRACH.

6. The UE of claim 5, wherein frequency-domain locations of PRACH sequences are determined based on a subcarrier spacing (SCS).

7. The UE of claim 5, wherein the specific length is 139,
   wherein zero padding is performed on two resource elements (REs) with lowest indices and three REs with highest indices among 144 REs included in the 12 consecutive PRBs, and
   wherein based on that the PRACH sequence is repeatedly mapped the plurality of times in the frequency domain, the zero padding is performed at same locations in each of the 12 consecutive PRBs.

8. The UE of claim 5, wherein a different root index and/or a different cyclic shift (CS) value is configured for each of PRACH sequences.

* * * * *